United States Patent
Shirakata

(10) Patent No.: US 8,867,148 B2
(45) Date of Patent: Oct. 21, 2014

(54) LENS BARREL AND IMAGING APPARATUS

(71) Applicant: Sony Corporation, Tokyo (JP)

(72) Inventor: Satoshi Shirakata, Tokyo (JP)

(73) Assignee: Sony Corporation, Tokyo (JP)

( * ) Notice: Subject to any disclaimer, the term of this patent is extended or adjusted under 35 U.S.C. 154(b) by 33 days.

(21) Appl. No.: 13/768,558

(22) Filed: Feb. 15, 2013

(65) Prior Publication Data

US 2013/0222687 A1    Aug. 29, 2013

(30) Foreign Application Priority Data

Feb. 27, 2012 (JP) ................. 2012-039797

(51) Int. Cl.
*G02B 15/14* (2006.01)
*G02B 7/02* (2006.01)
*G02B 7/10* (2006.01)

(52) U.S. Cl.
CPC . *G02B 7/10* (2013.01); *G02B 7/102* (2013.01)
USPC .......................... 359/699; 359/819

(58) Field of Classification Search
USPC ............ 359/699, 694, 676, 642, 819–830
See application file for complete search history.

(56) References Cited

U.S. PATENT DOCUMENTS 8,520,328 B2 * 8/2013 Iida ................. 359/819

FOREIGN PATENT DOCUMENTS

JP        4504697        4/2010

* cited by examiner

*Primary Examiner* — Tuyen Tra
(74) *Attorney, Agent, or Firm* — Wolf, Greenfield & Sacks, P.C.

(57) ABSTRACT

A lens barrel includes a cam follower, a first cam ring with a cam slide protrusion in which a cam groove engages with the cam follower, a second cam ring so supported by the first cam ring that both are unrotatable around an axis parallel to an optical axis, a rectilinear guide ring so supported by the second cam ring that the second cam and rectilinear guide rings are rotatable around the axis and unmovable in the optical axis direction, a rectilinear guide guiding the rectilinear guide ring in the optical axis direction, a rectilinear cam ring in which a cam slide groove engages the cam slide protrusion and which guides the rectilinear guide in the optical axis direction, and a rotary ring so supported by the rectilinear cam ring that the rectilinear cam and rotary rings are rotatable around the axis and unmovable in the optical axis direction.

6 Claims, 14 Drawing Sheets

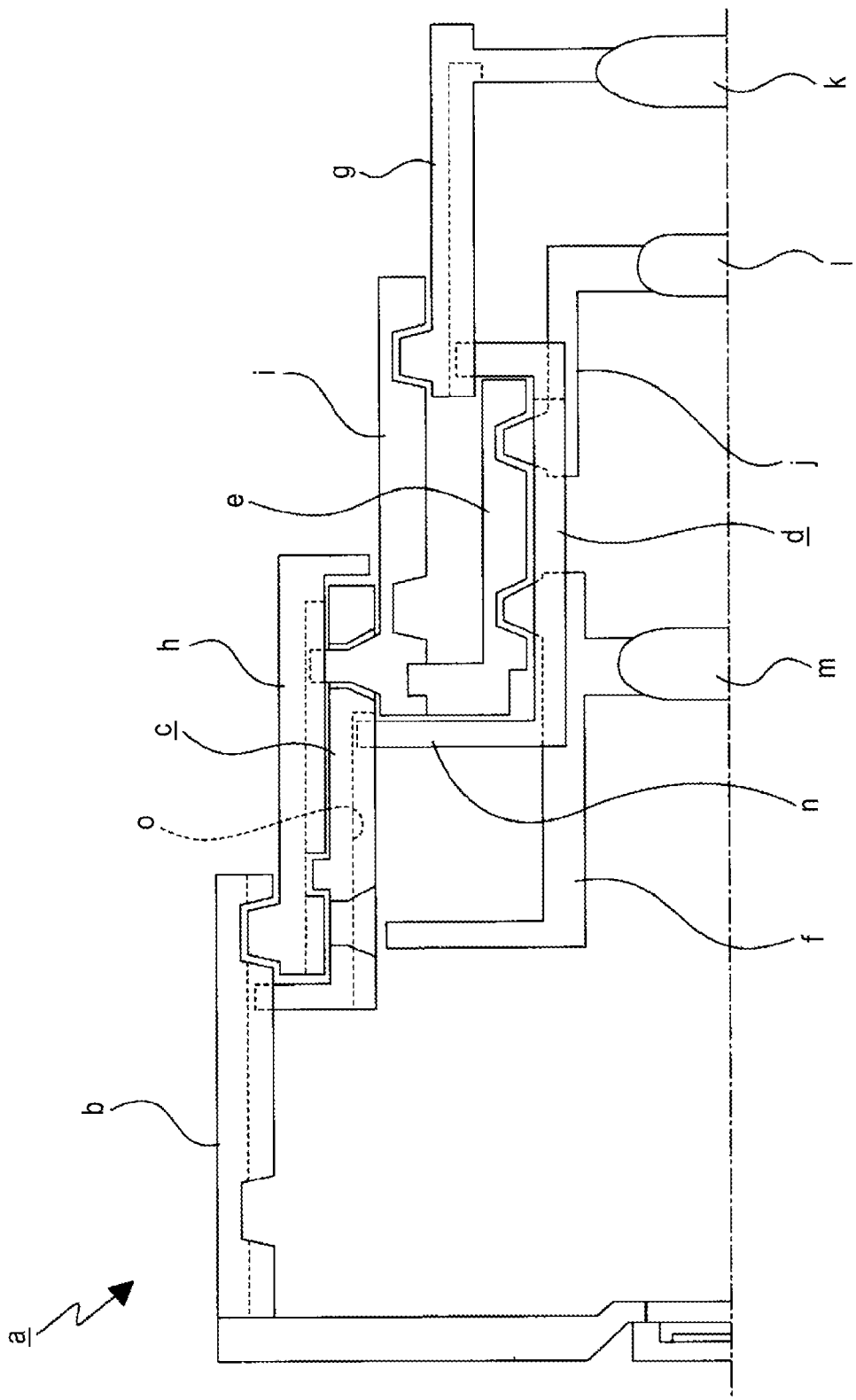

LENS BARREL AND IMAGING APPARATUS

CROSS REFERENCE TO RELATED APPLICATIONS

This application claims priority to Japanese Priority Patent Application JP 2012-039797, filed in the Japan Patent Office on Feb. 27, 2012, the entire contents of which are hereby incorporated by reference.

FIELD

The present technology relates to a technical field of a lens barrel and an imaging apparatus, and particularly to a technical field of size reduction achieved by employing a configuration in which the rectilinear component of a rectilinear guide ring that guides a first-group frame in the optical axis direction is passed from a rectilinear cam ring via a rectilinear guide/movable frame.

BACKGROUND

Some of a variety of imaging apparatus, such as video camcorders and still cameras, are what is called a collapsible-type imaging apparatus in which a lens barrel that accommodates a variety of optical parts, such as lenses, and optical devices is provided in an extendable/retractable manner and the lens barrel is retracted into an apparatus body when no image is captured while extended from the apparatus body for zoom magnification change and other operation when an image is captured (see Japanese Patent No. 4,504,697, for example).

Providing such a retractable lens barrel allows size reduction when no image is captured (reduction in thickness) and ensures satisfactory optical performance when an image is captured at the same time.

An example of the configuration of a lens barrel in an imaging apparatus of related art will be described below (see FIG. 14).

A lens barrel a includes a fixed ring b, a rectilinear cam ring c unable to rotate around the optical axis but guided by the fixed ring b along the optical axis and moved therealong, a rectilinear guide ring d guided by the rectilinear cam ring c along the optical axis and moved therealong, a second cam ring e, a rectilinear guide/movable frame f guided by the rectilinear guide ring d in the optical axis direction and moved therealong in response to the rotation of the second cam ring e around the optical axis, and a first-group frame g guided by the rectilinear guide ring d in the optical axis direction.

The fixed ring b supports a rotary ring h in such a way that the rotary ring h is rotatable around the optical axis and movable along the optical axis, and the rotary ring h holds the rectilinear cam ring c and supports a first cam ring i in such a way that the first cam ring i is movable along the optical axis. The first cam ring i rotates in response to the rotation of the rotary ring h around the optical axis.

The second cam ring e supports a movable frame j in such a way that the movable frame j is movable along the optical axis.

The first-group frame g holds a first lens group k. The movable frame j holds a second lens group l. The rectilinear guide/movable frame f holds a third lens group m.

The second cam ring e is located on the inner circumferential side of the rectilinear cam ring c, and the rectilinear guide ring d is located on the inner circumferential side of the second cam ring e. When the lens barrel is extended, the first cam ring i, the second cam ring e, and the rectilinear guide ring d protrude toward a subject relative to the rotary ring h and the rectilinear cam ring c, and the first-group frame g further protrudes toward the subject relative to the first cam ring i, the second cam ring e, and the rectilinear guide ring d.

In the thus configured lens barrel, the rectilinear guide ring d is connected to the first-group frame g, which is moved to a point closest to the subject, and the rectilinear guide ring d is guided by the rectilinear cam ring c along the optical axis because a guided protrusion n provided on the rectilinear guide ring d slidably engages with a guide groove o formed in the rectilinear cam ring c and extending along the optical axis.

SUMMARY

In the lens barrel a of the related art having the configuration described above, the rectilinear component of the rectilinear guide ring d, which guides the first-group frame g along the optical axis, is passed from the rectilinear cam ring c because the guided protrusion n slidably engages with the guide groove o, as described above.

However, the second cam ring e is located on the inner circumferential side of the rectilinear cam ring c and the rectilinear guide ring d is located on the inner circumferential side of the second cam ring e, which typically requires the guided protrusion n of the rectilinear guide ring d to be located in a position beyond the second cam ring e in the optical axis direction in order to prevent the guided protrusion n from interfering with the second cam ring e. As a result, the total length of the lens barrel a in the optical axis direction increases accordingly, which prevents size reduction.

It is therefore desirable to provide a lens barrel and an imaging apparatus that overcome the problem described above and allow size reduction in the optical axis direction.

An embodiment of the present technology is directed to a lens barrel including a first-group frame provided with a cam follower; a first cam ring which is provided with a cam slide protrusion and in which a cam groove that slidably engages with the cam follower is formed; a second cam ring so supported by the first cam ring that the first cam ring and the second cam ring are unable to rotate relative to each other around an axis parallel to an optical axis; a rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction; a rectilinear guide/movable frame that guides the rectilinear guide ring in the optical axis direction; a rectilinear cam ring in which a cam slide groove that slidably engages with the cam slide protrusion is formed and which guides the rectilinear guide/movable frame in the optical axis direction; and a rotary ring so supported by the rectilinear cam ring that the rectilinear cam ring and the rotary ring are rotatable relative to each other around the axis parallel to the optical axis and unmovable relative to each other in the optical axis direction.

In the thus configured lens barrel, the rectilinear component of the rectilinear guide ring, which guides the first-group frame in the optical axis direction, is passed from the rectilinear cam ring via the rectilinear guide/movable frame.

In the lens barrel described above, it is preferable that the second cam ring is so supported by the first cam ring that the first cam ring and the second cam ring are unable to move relative to each other in the optical axis direction.

Since the second cam ring is so supported by the first cam ring that the first cam ring and the second cam ring are unable to move relative to each other in the optical axis direction, the first and second cam rings are moved integrally with each other in the optical axis direction.

In the lens barrel described above, it is preferable that a cam engagement protrusion is provided on the second cam ring, and that a cam engagement groove that slidably engages with the cam engagement protrusion is formed in the rectilinear cam ring.

Since a cam engagement protrusion is provided on the second cam ring, and a cam engagement groove that slidably engages with the cam engagement protrusion is formed in the rectilinear cam ring, the second cam ring is moved in the optical axis direction irrespective of the movement of the first cam ring in the optical axis direction.

In the lens barrel described above, it is preferable that a cam drive protrusion is provided on the rectilinear guide/movable frame, and that a cam drive groove that slidably engages with the cam drive protrusion is formed in the second cam ring.

Since a cam drive protrusion is provided on the rectilinear guide/movable frame, and a cam drive groove that slidably engages with the cam drive protrusion is formed in the second cam ring, the rectilinear guide/movable frame is moved in the optical axis direction in response to the rotation of the second cam ring around the axis parallel to the optical axis.

In the lens barrel described above, it is preferable that the lens barrel further includes a movable frame having a cam action protrusion, a cam action groove that slidably engages with the cam action protrusion is formed in the second cam ring, a cam guide protrusion is provided on the rectilinear guide/movable frame, and a cam guide groove that slidably engages with the cam guide protrusion is formed in the rotary ring.

Since the lens barrel further includes a movable frame having a cam action protrusion; a cam action groove that slidably engages with the cam action protrusion is formed in the second cam ring; a cam guide protrusion is provided on the rectilinear guide/movable frame; and a cam guide groove that slidably engages with the cam guide protrusion is formed in the rotary ring, it is not necessary to form both the following two portions in the second cam ring: a portion that moves the movable frame in the optical axis direction; and a portion that moves the rectilinear guide/movable frame in the optical axis direction.

Another embodiment of the present technology is directed to an imaging apparatus including a lens barrel that accommodates an optical system and an imaging device that converts an optical image introduced via the optical system into an electric signal, and the lens barrel includes a first-group frame provided with a cam follower, a first cam ring which is provided with a cam slide protrusion and in which a cam groove that slidably engages with the cam follower is formed, a second cam ring so supported by the first cam ring that the first cam ring and the second cam ring are unable to rotate relative to each other around an axis parallel to an optical axis, a rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction, a rectilinear guide/movable frame that guides the rectilinear guide ring in the optical axis direction, a rectilinear cam ring in which a cam slide groove that slidably engages with the cam slide protrusion is formed and which guides the rectilinear guide/movable frame in the optical axis direction, and a rotary ring so supported by the rectilinear cam ring that the rectilinear cam ring and the rotary ring are rotatable relative to each other around the axis parallel to the optical axis and unmovable relative to each other in the optical axis direction.

In the thus configured imaging apparatus, the rectilinear component of the rectilinear guide ring, which guides the first-group frame in the optical axis direction, is passed from the rectilinear cam ring via the rectilinear guide/movable frame.

The lens barrel according to the embodiment of the present technology includes the first-group frame provided with the cam follower; the first cam ring which is provided with the cam slide protrusion and in which the cam groove that slidably engages with the cam follower is formed; the second cam ring so supported by the first cam ring that the first cam ring and the second cam ring are unable to rotate relative to each other around the axis parallel to the optical axis; the rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction; the rectilinear guide/movable frame that guides the rectilinear guide ring in the optical axis direction; the rectilinear cam ring in which the cam slide groove that slidably engages with the cam slide protrusion is formed and which guides the rectilinear guide/movable frame in the optical axis direction; and the rotary ring so supported by the rectilinear cam ring that the rectilinear cam ring and the rotary ring are rotatable relative to each other around the axis parallel to the optical axis and unmovable relative to each other in the optical axis direction.

It is therefore not necessary to provide the rectilinear guide ring with guided protrusions elongated in the optical axis direction, located beyond the second cam ring, and connecting the rectilinear guide ring to the rectilinear cam ring, whereby the size of the lens barrel in the optical axis direction can be reduced accordingly.

In the lens barrel according to a preferred embodiment of the present technology, the second cam ring is so supported by the first cam ring that the first cam ring and the second cam ring are unable to move relative to each other in the optical axis direction.

The first cam ring and the second cam ring are therefore moved integrally with each other in the optical axis direction, whereby the operation can be simplified.

In the lens barrel according to another preferred embodiment of the present technology, the cam engagement protrusion is provided on the second cam ring, and the cam engagement groove that slidably engages with the cam engagement protrusion is formed in the rectilinear cam ring.

As a result, the second cam ring is moved in the optical axis direction irrespective of the movement of the first cam ring in the optical axis direction, whereby the degree of freedom in design can be increased.

In the lens barrel according to still another preferred embodiment of the present technology, the cam drive protrusion is provided on the rectilinear guide/movable frame, and the cam drive groove that slidably engages with the cam drive protrusion is formed in the second cam ring.

As a result, since the rectilinear guide/movable frame is reliably moved in the optical axis direction in response to the rotation of the second cam ring around the axis parallel to the optical axis, the rectilinear guide/movable frame can be appropriately operated.

The lens barrel according to yet another preferred embodiment of the present technology further includes the movable frame having the cam action protrusion, the cam action groove that slidably engages with the cam action protrusion is formed in the second cam ring, the cam guide protrusion is provided on the rectilinear guide/movable frame, and the cam guide groove that slidably engages with the cam guide protrusion is formed in the rotary ring.

It is therefore not necessary to form both the following two portions in the second cam ring: a portion that moves the movable frame in the optical axis direction; and a portion that moves the rectilinear guide/movable frame in the optical axis direction. The degree of freedom in designing each of the second cam ring and the rotary ring therefore increases.

The imaging apparatus according to the another embodiment of the present technology includes the lens barrel that accommodates the optical system and the imaging device that converts the optical image introduced via the optical system into the electric signal, and the lens barrel includes the first-group frame provided with the cam follower, the first cam ring which is provided with the cam slide protrusion and in which the cam groove that slidably engages with the cam follower is formed, the second cam ring so supported by the first cam ring that the first cam ring and the second cam ring are unable to rotate relative to each other around the axis parallel to the optical axis, the rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction, the rectilinear guide/movable frame that guides the rectilinear guide ring in the optical axis direction, the rectilinear cam ring in which a cam slide groove that slidably engages with the cam slide protrusion is formed and which guides the rectilinear guide/movable frame in the optical axis direction, and the rotary ring so supported by the rectilinear cam ring that the rectilinear cam ring and the rotary ring are rotatable relative to each other around the axis parallel to the optical axis and unmovable relative to each other in the optical axis direction.

It is therefore not necessary to provide the rectilinear guide ring with guided protrusions elongated in the optical axis direction, located beyond the second cam ring, and connecting the rectilinear guide ring to the rectilinear cam ring, whereby the size of the lens barrel in the optical axis direction can be reduced accordingly.

BRIEF DESCRIPTION OF THE DRAWINGS

FIG. 14 is a cross-sectional view conceptually showing the configuration of a lens barrel of related art.

DETAILED DESCRIPTION

Embodiments of the present technology will be described below with reference to the accompanying drawings.

In the best mode described below, an imaging apparatus according to an embodiment of the present technology is a still camera, and a lens barrel according to another embodiment of the present technology is a lens barrel provided in the still camera.

It is noted that the present technology is not necessarily applied to a still camera and a lens barrel provided in the still camera but is widely applicable to a variety of imaging apparatus incorporated, for example, into a video camcorder and other apparatus and lens barrels provided in the variety of imaging apparatus.

In the following description, the front-rear, up-down, and right-left directions are defined relative to a user who uses a still camera to capture an image. That is, the subject side is the front side, and the camera user side is the rear side.

The front-rear, up-down, and right-left directions used below are defined for convenience of description and do not impose any limitation on implementation of the present technology.

[Configuration of Imaging Apparatus]

Figure 1:
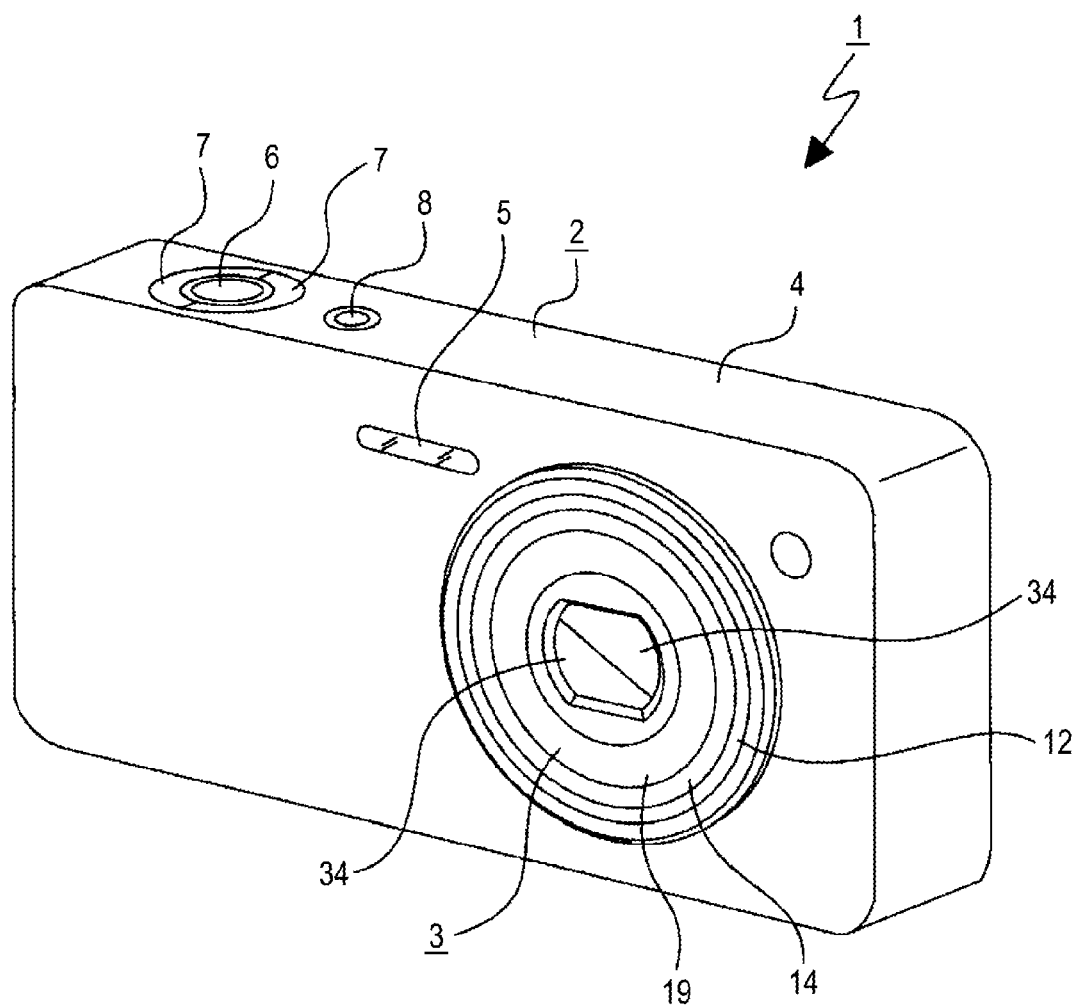
FIG. 1, along with FIGS. 2 to 13, shows embodiments of the present technology and is a perspective view of an imaging apparatus showing a state thereof in which a lens barrel is retracted into an apparatus body.
Figure 2:
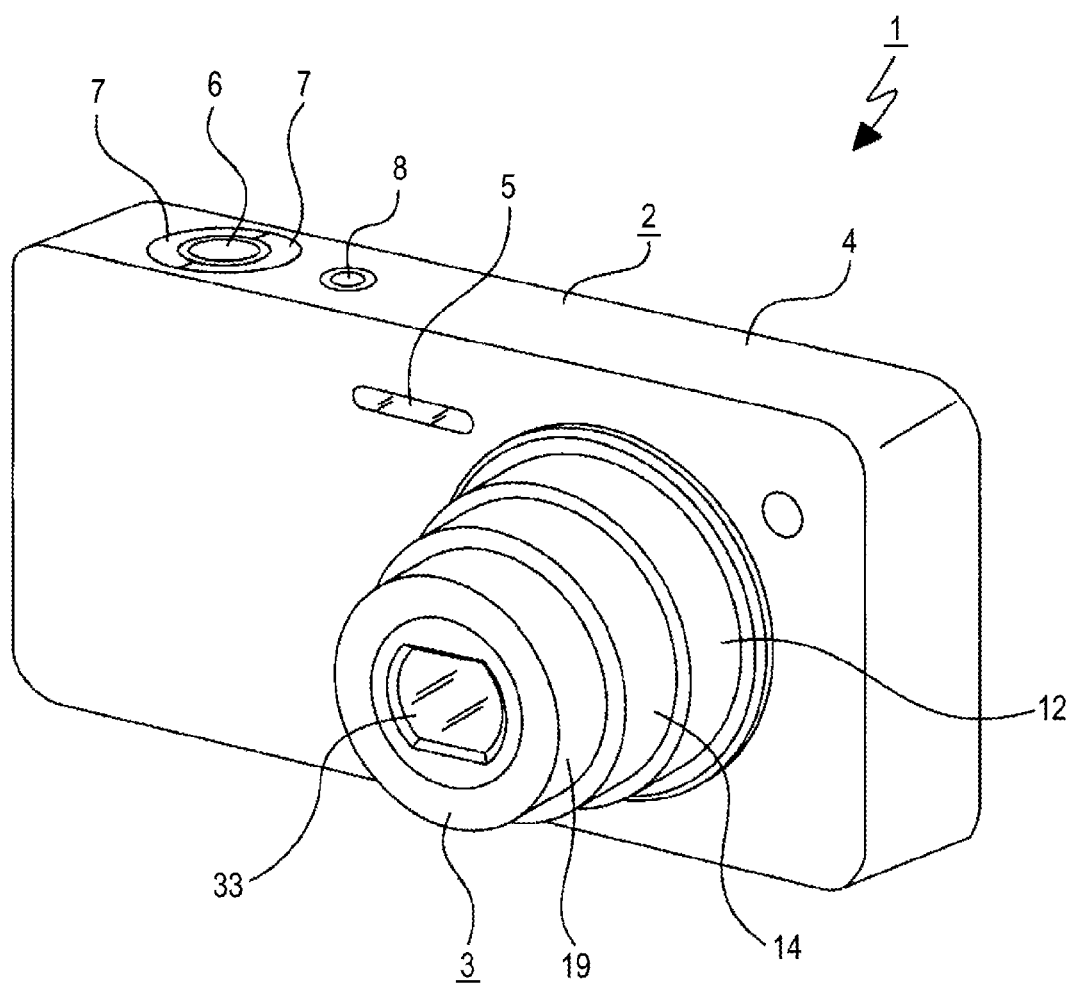
FIG. 2 is a perspective view of the imaging apparatus showing a state thereof in which the lens barrel protrudes from the apparatus body.

An imaging apparatus 1, which includes an apparatus body 2 and a lens barrel 3 so supported by the apparatus body 2 that the lens barrel 3 is movable in the front-rear direction (optical axis direction), is what is called a collapsible-type imaging apparatus in which the lens barrel 3 is retracted into the apparatus body 2 when no image is captured (see FIG. 1) whereas the lens barrel 3 protrudes forward from the apparatus body 2 when an image is captured (see FIG. 2) as shown in FIGS. 1 and 2. The lens barrel 3 is extendable between the following two positions: a retracted position where the lens barrel 3 is retracted into the apparatus body 2 (see FIG. 1); and an extended position where the lens barrel 3 protrudes forward from the apparatus body 2 (see FIG. 2).

The thus configured collapsible-type imaging apparatus 1 allows size reduction when no image is captured (reduction in thickness) and ensures satisfactory optical performance when an image is captured at the same time.

Figure 3:
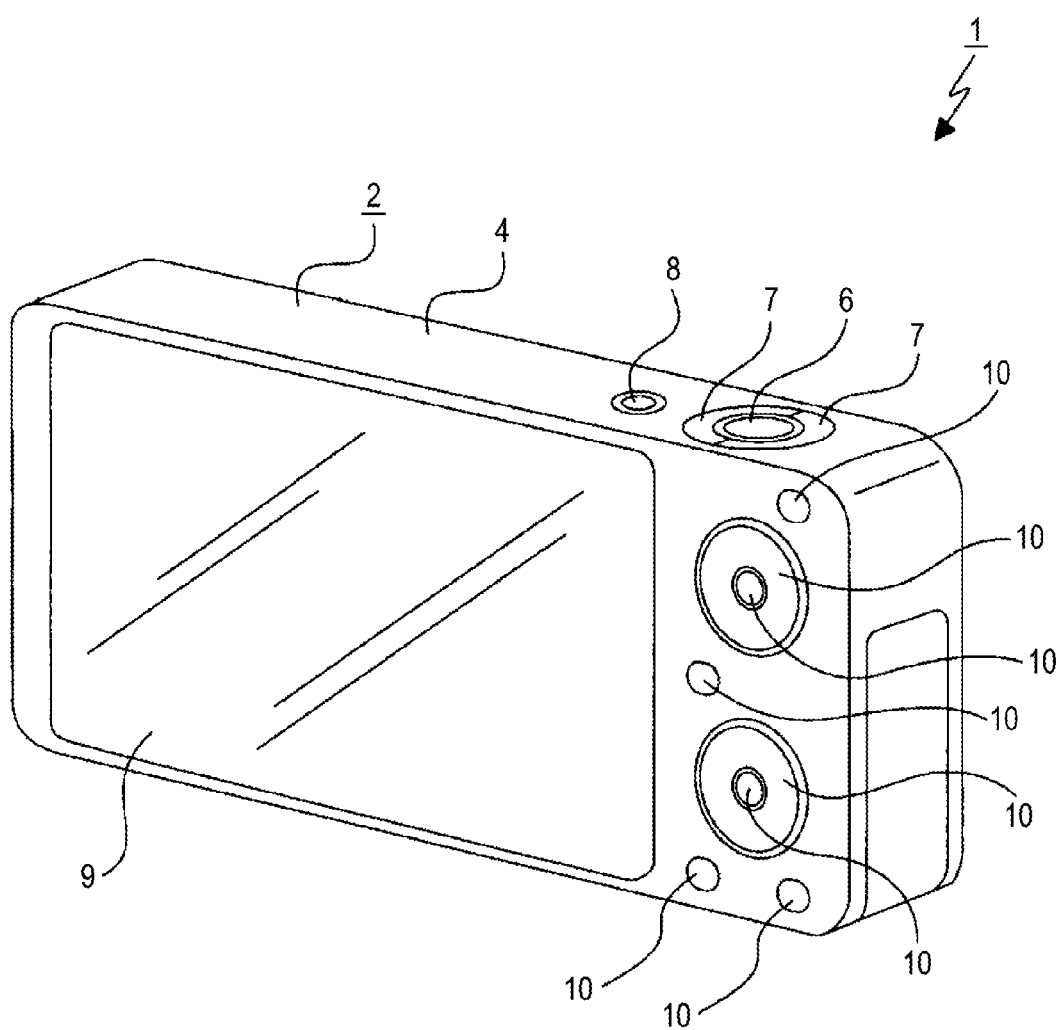
FIG. 3 is a perspective view of the imaging apparatus viewed in the direction opposite to the viewing direction in FIGS. 1 and 2.

The apparatus body 2 has necessary parts disposed, for example, inside and outside a horizontally elongated, flat-shaped enclosure 4 (see FIGS. 1 to 3).

A flashlight 5 is provided on the front side of the apparatus body 2. A shutter button 6, a zoom switch 7, and a power button 8 are provided on the upper side of the apparatus body 2. A display 9 and a variety of operation parts 10, 10, . . . are provided on the rear side of the apparatus body 2.

[Lens barrel]
<Configuration and Other Features of First Embodiment>

Figure 4:
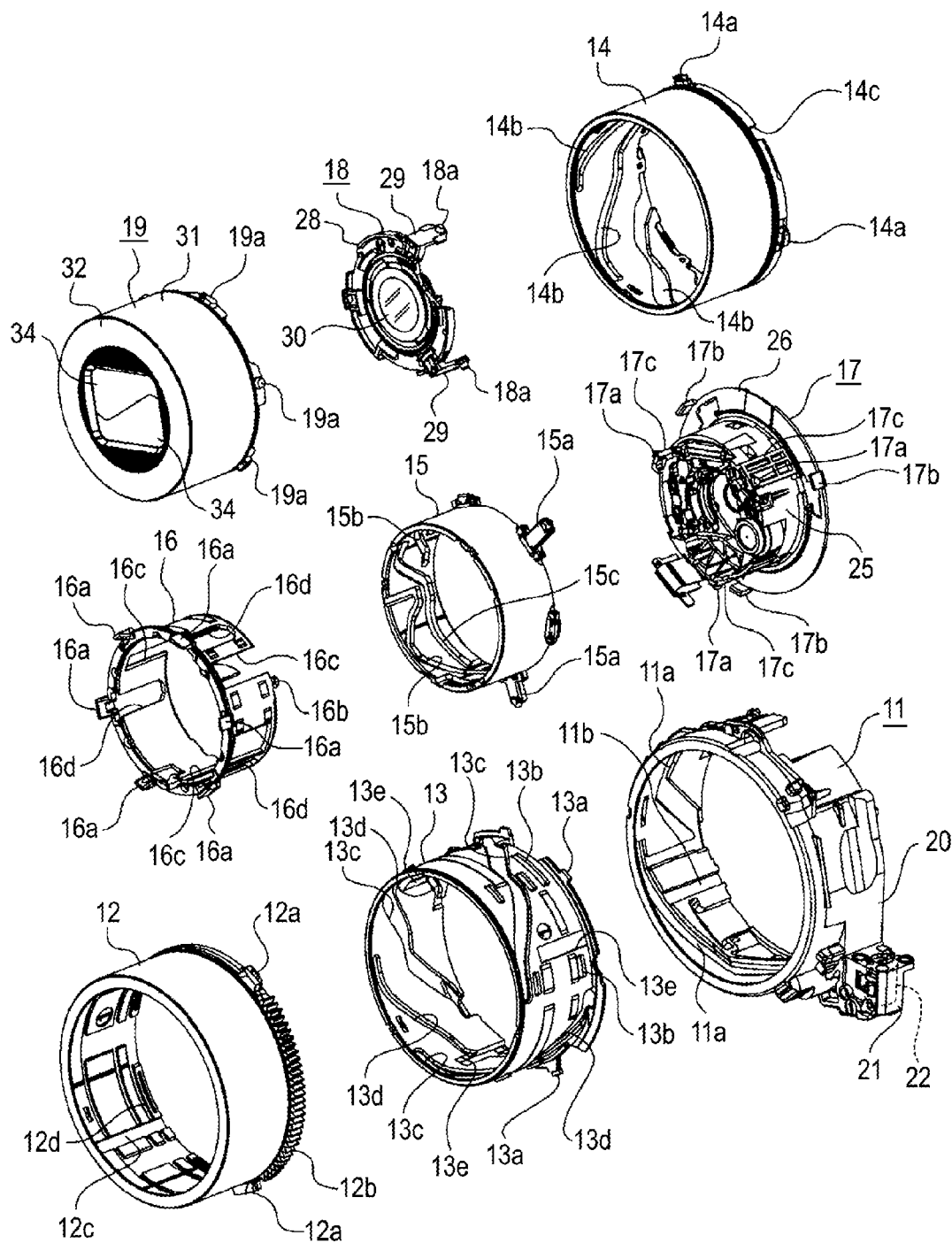
FIG. 4, along with FIGS. 5 and 6, shows a lens barrel according to a first embodiment and is an exploded perspective view.

The configuration of the lens barrel 3 according to a first embodiment will be described below (see FIGS. 4 to 6).

The lens barrel 3 includes a fixed ring 11, a rotary ring 12, a rectilinear cam ring 13, a first cam ring 14, a second cam ring 15, a rectilinear guide ring 16, a rectilinear guide/movable frame 17, a movable frame 18, and a first-group frame 19.

The fixed ring 11 has a substantially tubular body portion 20 and a motor attachment portion 21 provided on the outer circumferential surface of the body portion 20, and the fixed ring 11 is disposed in an immobile manner.

The fixed ring 11 has the following two types of groove formed in the inner circumferential surface of the body portion 20 in separate positions in the circumferential direction: cam displacement grooves 11a, 11a, 11a, each of which changes its position in the front-rear direction depending on the position in its circumferential direction; and rectilinear guide grooves 11b, 11b, 11b extending in the front-rear direction.

The motor attachment portion 21 supports a drive motor 22 and drive transmission parts, such as gears and worms, (not shown). The drive motor 22 transmits its drive force to the drive transmission parts.

The fixed ring 11 has a rear surface to which a fixing plate 23 is attached, and an imaging device 24 is attached to a central portion of the fixing plate 23.

The rotary ring 12 has a substantially tubular shape slightly smaller than the fixed ring 11, and cam displacement protrusions 12a, 12a, 12a protruding outward are provided in separate positions in the circumferential direction on a rear end portion of the rotary ring 12. A rack 12b extending in the circumferential direction is provided along the rear end portion of the outer circumferential surface of the rotary ring 12. The rotary ring 12 has the following two types of grooves formed in the inner circumferential surface thereof: rectilinear guide grooves 12c, 12c, 12c extending in the front-rear direction and a restriction groove 12d extending in the circumferential direction.

The cam displacement protrusions 12a, 12a, 12a of the rotary ring 12 slidably engage with the cam displacement grooves 11a, 11a, 11a of the fixed ring 11, respectively.

When the rack 12b engages with a gear (drive transmission part) supported by the fixed ring 11 and the drive force produced by the drive motor 22 is transmitted via the drive transmission part, the rotary ring 12 is rotated relative to the fixed ring 11 around an axis parallel to the optical axis. When the rotary ring 12 is rotated around the axis parallel to the optical axis, the rotary ring 12 is moved in the front-rear direction (optical axis direction) while the cam displacement protrusions 12a, 12a, 12a slide along the cam displacement grooves 11a, 11a, 11a.

The rectilinear cam ring 13 has a substantially tubular shape slightly smaller than the rotary ring 12, and guided protrusions 13a, 13a, 13a protruding outward are provided in separate positions in the circumferential direction on a rear end portion of the rectilinear cam ring 13. Restricted protrusions 13b, 13b, . . . extending in the circumferential direction are provided in separate positions in the circumferential direction on the outer circumferential surface of the rectilinear cam ring 13.

The rectilinear cam ring 13 has the following three types of groove formed therein in separate positions in the circumferential direction: cam slide grooves 13c, 13c, 13c, each of which changes its position in the front-rear direction depending on its position in the circumferential direction; cam engagement grooves 13d, 13d, 13d, each of which changes its position in the front-rear direction depending on its position in the circumferential direction; and rectilinear lead grooves 13e, 13e, 13e extending in the front-rear direction.

The guided protrusions 13a, 13a, 13a of the rectilinear cam ring 13 slidably engage with the rectilinear guide grooves 11b, 11b, 11b of the fixed ring 11, respectively. The restricted protrusions 13b, 13b, . . . of the rectilinear cam ring 13 slidably engage with the restriction groove 12d of the rotary ring 12.

The movement of the rectilinear cam ring 13 relative to the rotary ring 12 in the front-rear direction is therefore restricted by the engagement between the restricted protrusions 13b, 13b, . . . and the restriction groove 12d, and the rectilinear cam ring 13 and the rotary ring 12 are integrally moved relative to the fixed ring 11 in the optical axis direction in response to the rotation of the rotary ring 12 while the guided protrusions 13a, 13a, 13a are guided along the rectilinear guide grooves 11b, 11b, 11b.

The first cam ring 14 has a substantially tubular shape slightly smaller than the rectilinear cam ring 13, and cam slide protrusions 14a, 14a, 14a protruding outward are provided in separate positions in the circumferential direction on a rear end portion of the first cam ring 14.

Cam grooves 14b, 14b, . . . are formed in the first cam ring 14, and each of the cam grooves 14b, 14b, . . . changes its position in the front-rear direction depending on the position in the circumferential direction. Rectilinear guide recesses 14c, 14c, 14c, each of which is open rearward, are formed in separate positions in the circumferential direction in a rear end portion of the first cam ring 14.

The cam slide protrusions 14a, 14a, 14a of the first cam ring 14 slidably engage with the cam slide grooves 13c, 13c, 13c of the rectilinear cam ring 13 respectively and pass therethrough, and front end portions of the cam slide protrusions 14a, 14a, 14a slidably engage with the rectilinear guide grooves 12c, 12c, 12c of the rotary ring 12.

As a result, the first cam ring 14 is, in response to the rotation of the rotary ring 12 around the axis parallel to the optical axis, rotated and moved in the optical axis direction while the cam slide protrusions 14a, 14a, 14a slide along the cam slide grooves 13c, 13c, 13c and the rectilinear guide grooves 12c, 12c, 12c. That is, the first cam ring 14 is moved in the optical axis direction while rotating around the axis parallel to the optical axis.

The second cam ring 15 has a substantially tubular shape smaller than the first cam ring 14, and cam engagement protrusions 15a, 15a, 15a protruding outward are provided in separate positions in the circumferential direction on a rear end portion of the second cam ring 15.

The second cam ring 15 has the following two types of groove formed therein alternately in the circumferential direction: cam action grooves 15b, 15b, 15b, each of which changes its position in the front-rear direction depending on its position in the circumferential direction; and cam drive grooves 15c, 15c, 15c, each of which changes its position in the front-rear direction depending on its position in the circumferential direction. Further, slide restriction groove 15d, 15d, 15d extending in the circumferential direction are formed in separate positions in the circumferential direction in a rear end portion of the second cam ring 15.

The cam engagement protrusions 15a, 15a, 15a of the second cam ring 15 not only slidably engage with the cam engagement grooves 13d, 13d, 13d of the rectilinear cam ring 13, respectively, but also slidably engage with the rectilinear guide recesses 14c, 14c, 14c of the first cam ring 14, respectively.

As a result, the second cam ring 15 is, in response to the rotation of the first cam ring 14 around the axis parallel to the optical axis, rotated and moved in the optical axis direction while the cam engagement protrusions 15*a*, 15*a*, 15*a* slide along the cam engagement grooves 13*d*, 13*d*, 13*d* and the rectilinear guide recesses 14*c*, 14*c*, 14*c*. That is, the second cam ring 15 is moved in the optical axis direction while rotating around the axis parallel to the optical axis.

The rectilinear guide ring 16 has a substantially tubular shape slightly smaller than the second cam ring 15, and guide protrusions 16*a*, 16*a*, . . . protruding outward are provided in separate positions in the circumferential direction on a front end portion of the rectilinear guide ring 16. Further, slide restricted protrusions 16*b*, 16*b*, 16*b* protruding outward are provided in separate positions in the circumferential direction on a rear end portion of the rectilinear guide ring 16.

The rectilinear guide ring 16 has the following two types of groove formed therein in separate positions alternately in the circumferential direction: first guided grooves 16*c*, 16*c*, 16*c* extending in the front-rear direction; and second guided grooves 16*d*, 16*d*, 16*d* extending in the front-rear direction.

The slide restricted protrusions 16*b*, 16*b*, 16*b* of the rectilinear guide ring 16 slidably engage with the slide restriction groove 15*d*, 15*d*, 15*d* of the second cam ring 15, respectively.

The rectilinear guide/movable frame 17 has a holding tubular portion 25 having a substantially tubular shape slightly smaller than the second cam ring 15 and a flange portion 26 overhanging outward from a rear end portion of the holding tubular portion 25.

The holding tubular potion 25 holds a third lens group 27.

Cam drive protrusions 17*a*, 17*a*, 17*a* protruding outward are provided in separate positions in the circumferential direction on a front end portion of the holding tubular portion 25 of the rectilinear guide/movable frame 17. Rectilinear lead protrusions 17*b*, 17*b*, 17*b* protruding forward are provided in separate positions in the circumferential direction on an outer circumferential portion of the flange portion 26 of the rectilinear guide/movable frame 17.

The cam drive protrusions 17*a*, 17*a*, 17*a* of the rectilinear guide/movable frame 17 slidably engage with the cam drive grooves 15*c*, 15*c*, 15*c* of the second cam ring 15, respectively. The rectilinear lead protrusions 17*b*, 17*b*, 17*b* of the rectilinear guide/movable frame 17 slidably engage with the rectilinear lead grooves 13*e*, 13*e*, 13*e* of the rectilinear cam ring 13, respectively.

As a result, the rectilinear guide/movable frame 17 is moved in the optical axis direction in response to the rotation of the second cam ring 15 while the cam drive protrusions 17*a*, 17*a*, 17*a* slide along the cam drive grooves 15*c*, 15*c*, 15*c* and the rectilinear lead protrusions 17*b*, 17*b*, 17*b* are guided along the rectilinear lead grooves 13*e*, 13*e*, 13*e*.

Further, guide protruding threads 17*c*, 17*c*, 17*c* extending in the front-rear direction are provided in separate positions in the circumferential direction on the outer circumferential surface of the holding tubular portion 25 of the rectilinear guide/movable frame 17. The guide protruding threads 17*c*, 17*c*, 17*c* slidably engage with the guided grooves 16*c*, 16*c*, 16*c* of the rectilinear guide ring 16, respectively.

As a result, the rectilinear guide ring 16 is movable in the optical axis direction because the guided grooves 16*c*, 16*c*, 16*c* are guided along the guide protruding threads 17*c*, 17*c*, 17*c*, and when the second cam ring 15 is moved in the optical axis direction while rotating around the axis parallel to the optical axis, the rectilinear guide ring 16 is moved in response to the movement of the second cam ring 15 in the optical axis direction.

The movable frame 18 has a holding plate portion 28 having a substantially disc shape slightly smaller than the second cam ring 15 and slide arm portions 29, 29, 29 provided in separate positions in the circumferential direction and protruding rearward from an outer circumferential portion of the holding plate portion 28.

Cam action protrusions 18*a*, 18*a*, 18*a* protruding outward are provided on rear end portions of the slide arm portions 29, 29, 29 of the movable frame 18, respectively.

The holding plate portion 28 holds a second lens group 30.

The cam action protrusions 18*a*, 18*a*, 18*a* of the movable frame 18 slidably engage with the cam action grooves 15*b*, 15*b*, 15*b* of the second cam ring 15, respectively. The slide arm portions 29, 29, 29 of the movable frame 18 slidably engage with the second guided grooves 16*d*, 16*d*, 16*d* of the rectilinear guide ring 16.

As a result, the movable frame 18 is moved in the optical axis direction in response to the rotation of the second cam ring 15 while the cam action protrusions 18*a*, 18*a*, 18*a* slide along the cam action grooves 15*b*, 15*b*, 15*b* and the slide arm portions 29, 29, 29 are guided along the second guided grooves 16*d*, 16*d*, 16*d*.

The first-group frame 19 has a tubular portion 31 having a substantially annular shape slightly smaller than the first cam ring 14 and a holding surface portion 32 overhanging inward from a front end portion of the tubular portion 31.

Cam followers 19*a*, 19*a*, 19*a* protruding outward are provided on a rear end portion of the tubular portion 31 of the first-group frame 19.

Guided grooves 19*b*, 19*b*, . . . extending in the front-rear direction are formed in separate positions in the circumferential direction in the tubular portion 31 of the first-group frame 19.

The holding surface portion 32 holds a first lens group 33.

The cam followers 19*a*, 19*a*, 19*a* of the first-group frame 19 slidably engage with the cam grooves 14*b*, 14*b*, . . . of the first cam ring 14, respectively. The guided grooves 19*b*, 19*b*, . . . of the first-group frame 19 slidably engage with the guide protrusions 16*a*, 16*a*, . . . of the rectilinear guide ring 16.

As a result, the first-group frame 19 is moved in the optical axis direction in response to the rotation of the first cam ring 14 while the cam followers 19*a*, 19*a*, 19*a* slide along the cam grooves 14*b*, 14*b*, . . . and the guided grooves 19*b*, 19*b*, . . . are guided by the guide protrusions 16*a*, 16*a*, . . . .

Lens barriers 34, 34 are supported in an openable and closable manner on the front end side of the first-group frame 19. In the retracted position, where the lens barrel 3 is retracted into the apparatus body 2, the lens barriers 34, 34 are closed and block the first lens group 33 (see FIG. 1). When the lens barrel 3 is extended, the lens barriers 34, 34 are opened and expose the first lens group 33, and the apparatus is ready to capture an image of a subject (see FIG. 2).

<Operation in First Embodiment>

Figure 5:
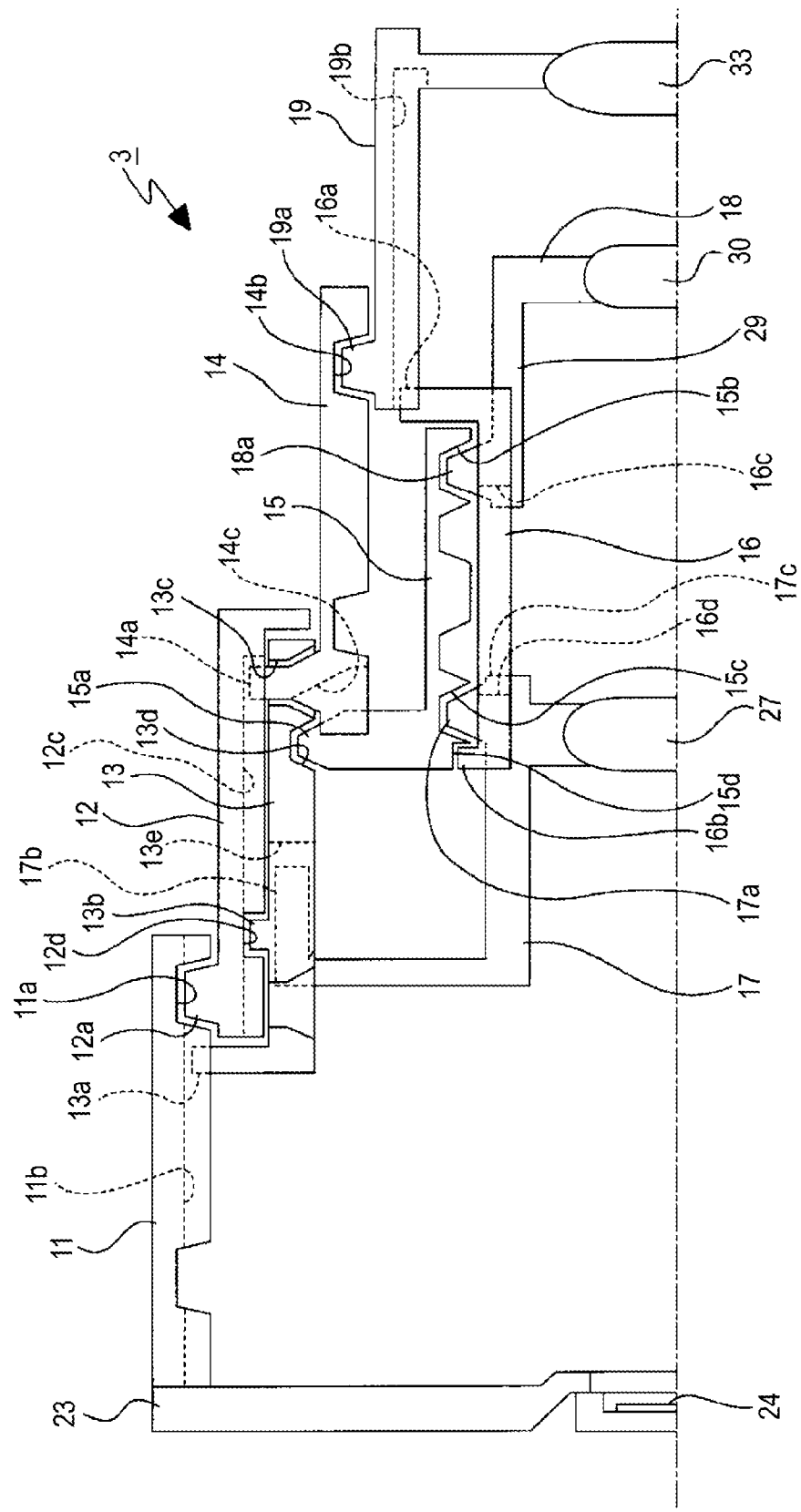
FIG. 5 is a cross-sectional view conceptually showing the state of the lens barrel in an extended position.
Figure 6:
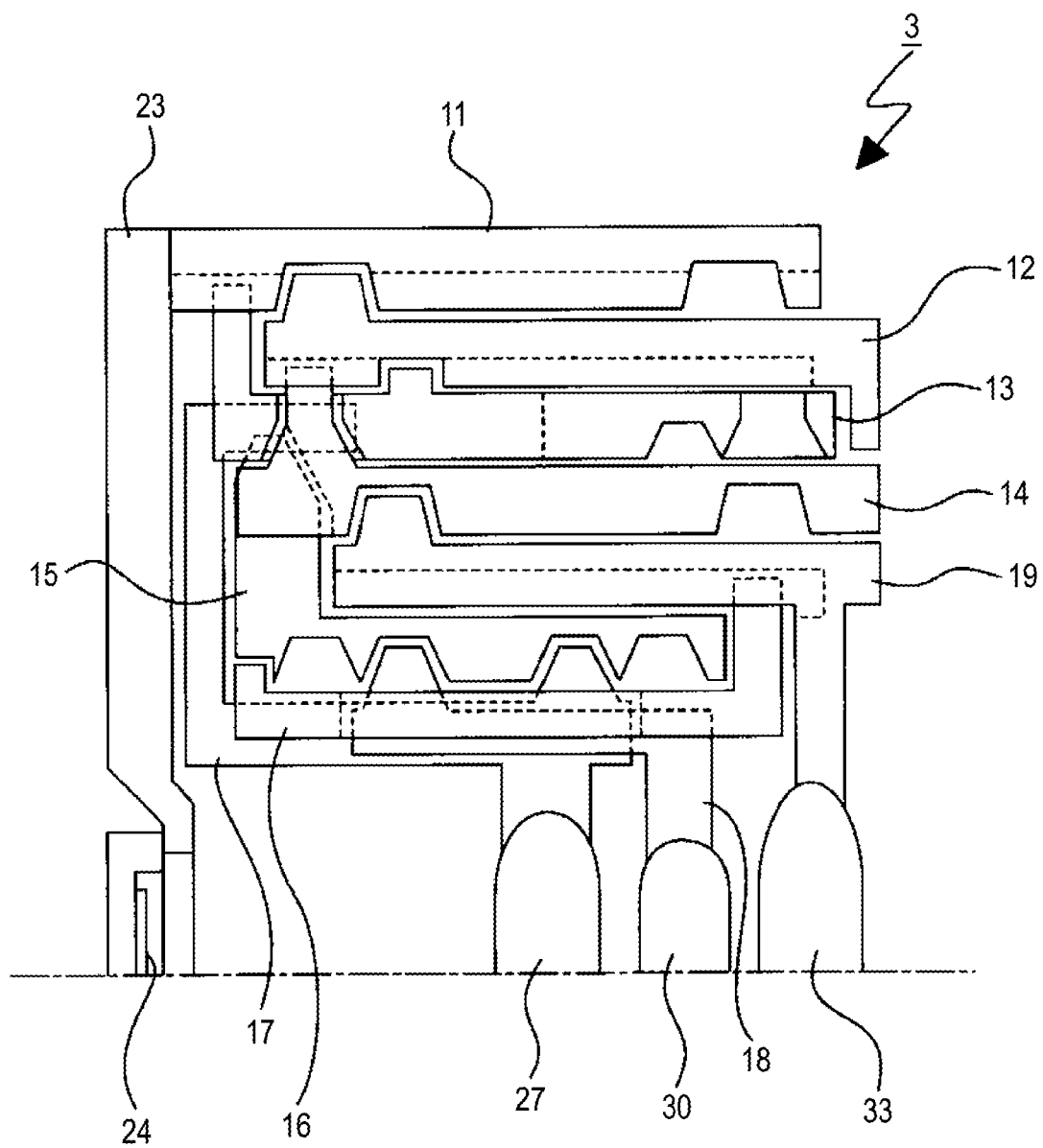
FIG. 6 is a cross-sectional view conceptually showing the state of the lens barrel in a retracted position.

The lens barrel 3 configured as described above operates in such a way that the lens barrel 3 is extendable between the retracted position (see FIG. 6) and the extended position (see FIG. 5).

When the drive force produced by the drive motor 22 rotates the rotary ring 12 in the extended position around the axis parallel to the optical axis, the rotary ring 12 is moved in the optical axis direction while the cam displacement protrusions 12*a*, 12*a*, 12*a* slide along the cam displacement grooves 11*a*, 11*a*, 11*a*.

When the drive force produced by the drive motor 22 rotates the rotary ring 12, the other portions operate as follows.

The guided protrusions 13a, 13a, 13a are guided along the rectilinear guide grooves 11b, 11b, 11b in response to the rotation of the rotary ring 12, and the rectilinear cam ring 13 is moved as the rotary ring 12 is moved in the optical axis direction.

The first cam ring 14 is, in response to the rotation of the rotary ring 12 around the axis parallel to the optical axis, rotated and moved in the optical axis direction while the cam slide protrusions 14a, 14a, 14a slide along the cam slide grooves 13c, 13c, 13c and the rectilinear guide grooves 12c, 12c, 12c.

The second cam ring 15 is, in response to the rotation of the first cam ring 14 around the axis parallel to the optical axis, rotated and moved in the optical axis direction while the cam engagement protrusions 15a, 15a, 15a slide along the cam engagement grooves 13d, 13d, 13d and the rectilinear guide recesses 14c, 14c, 14c.

The rectilinear guide/movable frame 17 is moved in the optical axis direction in response to the rotation of the second cam ring 15 while the cam drive protrusions 17a, 17a, 17a slide along the cam drive grooves 15c, 15c, 15c, respectively, and the rectilinear lead protrusions 17b, 17b, 17b are guided along the rectilinear lead grooves 13e, 13e, 13e, respectively.

Since the second cam ring 15 is moved in the optical axis direction while rotating around the axis parallel to the optical axis, the rectilinear guide ring 16 is moved in response to the movement of the second cam ring 15 in the optical axis direction.

The movable frame 18 is moved in the optical axis direction in response to the rotation of the second cam ring 15 while the cam action protrusions 18a, 18a, 18a slide along the cam action grooves 15b, 15b, 15b and the slide arm portions 29, 29, 29 are guided along the second guided grooves 16d, 16d, 16d.

The first-group frame 19 is moved in the optical axis direction in response to the rotation of the first cam ring 14 while the cam followers 19a, 19a, 19a slide along the cam grooves 14b, 14b, . . . and the guided grooves 19b, 19b, . . . are guided by the guide protrusions 16a, 16a, . . . .

As described above, since the first-group frame 19, the movable frame 18, and the rectilinear guide/movable frame 17 are moved in the optical axis direction, the first lens group 33, the second lens group 30, and the third lens group 27 held by the first-group frame 19, the movable frame 18, and the rectilinear guide/movable frame 17 respectively are moved in the optical axis direction for zooming.

<Brief of First Embodiment>

As described above, the lens barrel 3 includes the first-group frame 19, which holds the first lens group 33, the rectilinear guide ring 16, which guides the first-group frame 19 in the optical axis direction, the rectilinear guide/movable frame 17, which guides the rectilinear guide ring 16 in the optical axis direction, and the rectilinear cam ring 13, which guides the rectilinear guide/movable frame 17 in the optical axis direction, and the lens barrel 3 is so configured that the rectilinear component of the rectilinear guide ring 16, which guides the first-group frame 19 in the optical axis direction, is passed from the rectilinear cam ring 13 via the rectilinear guide/movable frame 17.

It is therefore not necessary to provide the rectilinear guide ring 16 with guided protrusions elongated in the optical axis direction, located beyond the second cam ring 15, and connecting the rectilinear guide ring 16 to the rectilinear cam ring 13, whereby the size of the lens barrel 3 in the optical axis direction can be reduced accordingly.

Further, since the rectilinear guide/movable frame 17 is a member necessary to form the lens barrel 3, the number of parts will not increase even when the lens barrel 3 is so configured that the rectilinear component of the rectilinear guide ring 16 is passed from the rectilinear cam ring 13 via the rectilinear guide/movable frame 17, whereby the size of the lens barrel 3 can be reduced without any increase in the number of parts or manufacturing cost.

Further, in the lens barrel 3, the cam engagement protrusions 15a, 15a, 15a are provided on the second cam ring 15, and the cam engagement grooves 13d, 13d, 13d, which slidably engage with the cam engagement protrusions 15a, 15a, 15a respectively, are formed in the rectilinear cam ring 13.

As a result, the second cam ring 15 is moved in the optical axis direction irrespective of the movement of the first cam ring 14 in the optical axis direction, whereby the degree of freedom in design can be increased.

Further, in the lens barrel 3, the cam drive protrusions 17a, 17a, 17a are provided on the rectilinear guide/movable frame 17, and the cam drive grooves 15c, 15c, 15c, which slidably engage with the cam drive protrusions 17a, 17a, 17a respectively, are formed in the second cam ring 15.

As a result, since the rectilinear guide/movable frame 17 is reliably moved in the optical axis direction in response to the rotation of the second cam ring 15 around the axis parallel to the optical axis, the rectilinear guide/movable frame 17 can be appropriately operated.

<Configuration and Other Features of Second Embodiment>

The configuration of a lens barrel 3A according to a second embodiment will next be described (see FIGS. 7 and 8).

The lens barrel 3A described below differs from the lens barrel 3 described above only in terms of the configurations of the rectilinear cam ring, the first cam ring, and the second cam ring, and only portions different from the corresponding portions of the lens barrel 3 will therefore be described in detail. The other portions have the same reference characters as those of the corresponding portions of the lens barrel 3, and no description thereof will be made.

The lens barrel 3A includes the fixed ring 11, the rotary ring 12, a rectilinear cam ring 13A, a first cam ring 14A, a second cam ring 15A, the rectilinear guide ring 16, the rectilinear guide/movable frame 17, the movable frame 18, and the first-group frame 19.

The rectilinear cam ring 13A has a substantially tubular shape slightly smaller than the rotary ring 12, and no cam engagement grooves 13d, 13d, 13d are formed in the rectilinear cam ring 13A.

The first cam ring 14A has a substantially tubular shape slightly smaller than the rectilinear cam ring 13A, and fitting recesses 14d, 14d, 14d are formed in separate positions in the circumferential direction in a rear end portion of the first cam ring 14A. No rectilinear guide recesses 14c, 14c, 14c are formed in the first cam ring 14A.

The second cam ring 15A has a substantially tubular shape smaller than the first cam ring 14A, and fitting protrusions 15e, 15e, 15e are provided in separate positions in the circumferential direction on a rear end portion of the second cam ring 15A. No cam engagement protrusions 15a, 15a, 15a are provided on the second cam ring 15A.

The second cam ring 15A is connected to the first cam ring 14A with the fitting protrusions 15e, 15e, 15e of the second cam ring 15A fit into the fitting recesses 14d, 14d, 14d of the first cam ring 14A.

The second cam ring 15A is therefore rotated integrally with the first cam ring 14A as the first cam ring 14A is rotated around the axis parallel to the optical axis and moved integrally with the first cam ring 14A as the first cam ring 14A is moved in the optical axis direction.

It is noted that the connection between the second cam ring 15A and the first cam ring 14A is not limited to the fitting between the fitting protrusions 15e, 15e, 15e and the fitting recesses 14d, 14d, 14d but may, for example, be screw fastening or adhesive bonding.

Further, the connection between the second cam ring 15A and the first cam ring 14A may alternatively be made by fitting connection in the optical axis direction and fitting connection in the circumferential direction in different positions.

<Operation in Second Embodiment>

Figure 7:
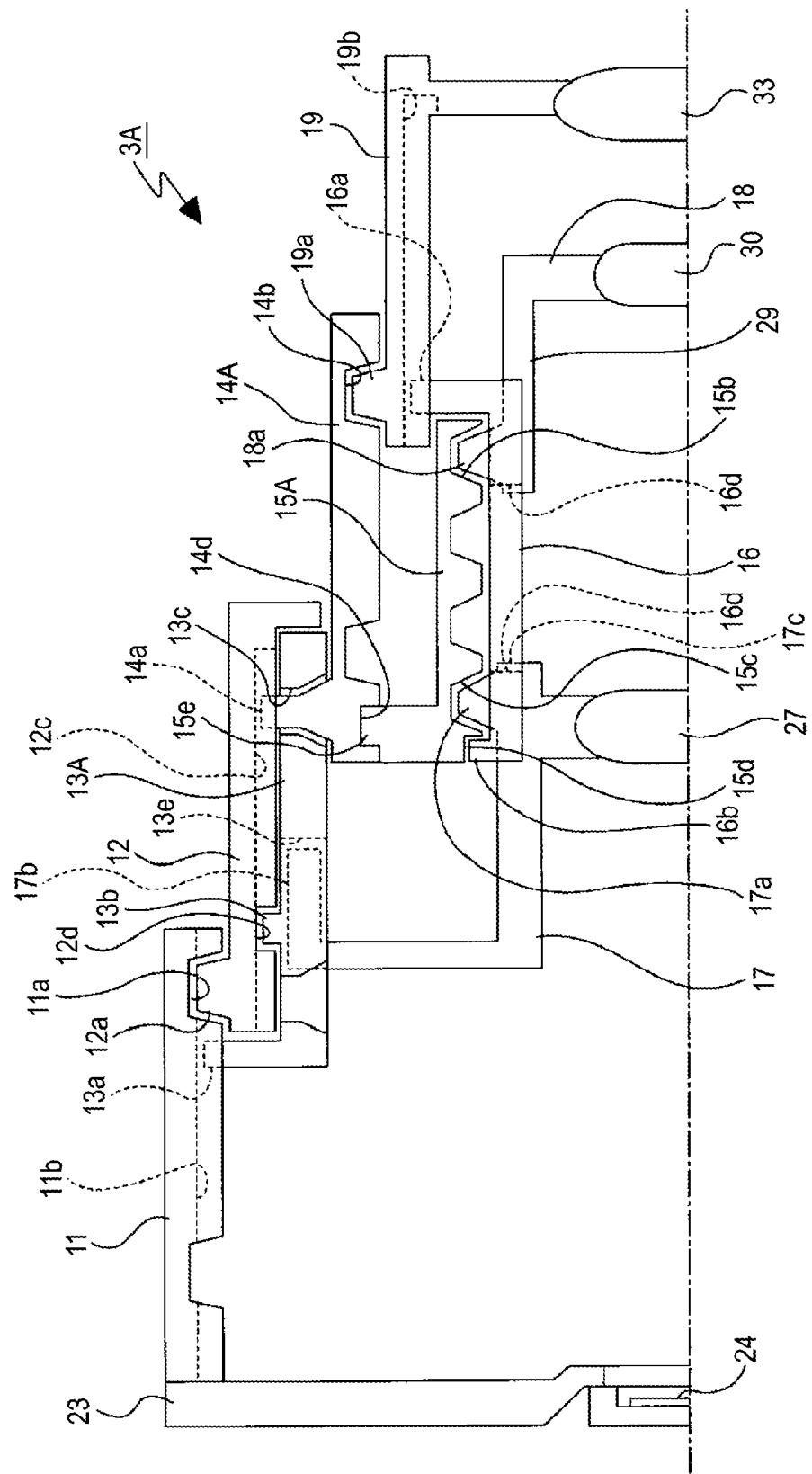
FIG. 7, along with FIG. 8, shows a lens barrel according to a second embodiment and is a cross-sectional view conceptually showing the state of the lens barrel in the extended position.
Figure 8:
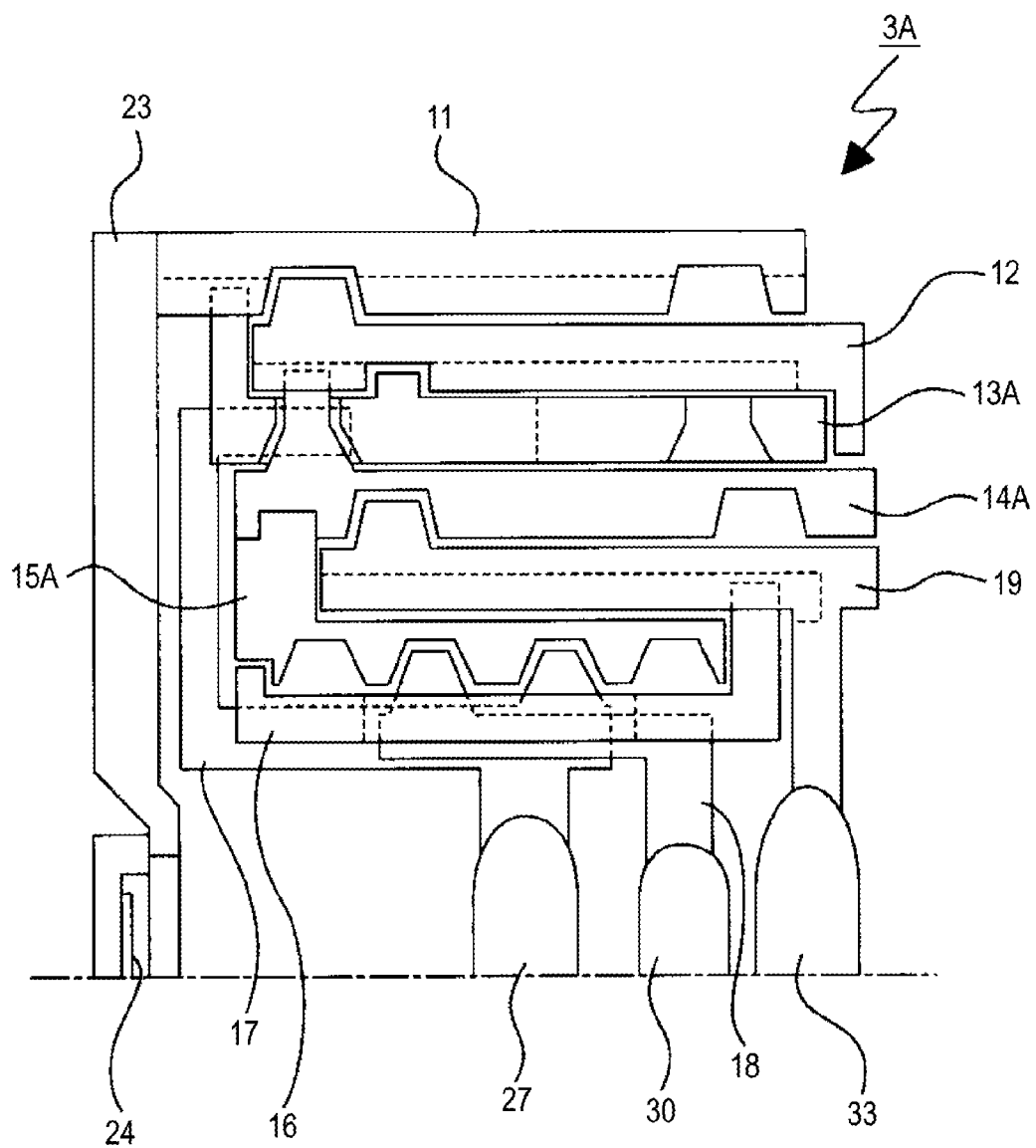
FIG. 8 is a cross-sectional view conceptually showing the state of the lens barrel in the retracted position.

The lens barrel 3A configured as described above operates in such a way that the lens barrel 3A is extendable between the retracted position (see FIG. 8) and the extended position (see FIG. 7).

When the drive force produced by the drive motor 22 rotates the rotary ring 12, the other portions operate as follows.

The guided protrusions 13a, 13a, 13a are guided along the rectilinear guide grooves 11b, 11b, 11b in response to the rotation of the rotary ring 12, and the rectilinear cam ring 13A is moved integrally with the rotary ring 12 as the rotary ring 12 is moved in the optical axis direction.

The first cam ring 14A is, in response to the rotation of the rotary ring 12 around the axis parallel to the optical axis, rotated integrally with the rotary ring 12 and moved in the optical axis direction while the cam slide protrusions 14a, 14a, 14a slide along the cam slide grooves 13c, 13c, 13c and the rectilinear guide grooves 12c, 12c, 12c.

The second cam ring 15A is rotated integrally with the first cam ring 14A in response to the rotation thereof around the axis parallel to the optical axis and moved integrally with the first cam ring 14A in response to the movement thereof in the optical axis direction.

<Brief of Second Embodiment>

As described above, the lens barrel 3A includes the first-group frame 19, which holds the first lens group 33, the rectilinear guide ring 16, which guides the first-group frame 19 in the optical axis direction, the rectilinear guide/movable frame 17, which guides the rectilinear guide ring 16 in the optical axis direction, and the rectilinear cam ring 13A, which guides the rectilinear guide/movable frame 17 in the optical axis direction, and the lens barrel 3B is so configured that the rectilinear component of the rectilinear guide ring 16, which guides the first-group frame 19 in the optical axis direction, is passed from the rectilinear cam ring 13A via the rectilinear guide/movable frame 17.

It is therefore not necessary to provide the rectilinear guide ring 16 with guided protrusions elongated in the optical axis direction, located beyond the second cam ring 15A, and connecting the rectilinear guide ring 16 to the rectilinear cam ring 13A, whereby the size of the lens barrel 3A in the optical axis direction can be reduced accordingly.

Further, since the rectilinear guide/movable frame 17 is a member necessary to form the lens barrel 3A, the number of parts will not increase even when the lens barrel 3A is so configured that the rectilinear component of the rectilinear guide ring 16 is passed from the rectilinear cam ring 13A via the rectilinear guide/movable frame 17, whereby the size of the lens barrel 3A can be reduced without any increase in the number of parts or manufacturing cost.

Further, in the lens barrel 3A, the first cam ring 14A and the second cam ring 15A are so supported that they are unable to move relative to each other in the optical axis direction.

The first cam ring 14A and the second cam ring 15A are therefore moved integrally with each other in the optical axis direction, whereby the operation can be simplified.

Further, in the lens barrel 3A, the cam drive protrusions 17a, 17a, 17a are provided on the rectilinear guide/movable frame 17, and the cam drive grooves 15c, 15c, 15c, which slidably engage with the cam drive protrusions 17a, 17a, 17a respectively, are formed in the second cam ring 15A.

As a result, since the rectilinear guide/movable frame 17 is reliably moved in the optical axis direction in response to the rotation of the second cam ring 15A around the axis parallel to the optical axis, the rectilinear guide/movable frame 17 can be appropriately operated.

<Configuration and Other Features of Third Embodiment>

The configuration of a lens barrel 3B according to a third embodiment will be described below (see FIGS. 9 and 10).

The lens barrel 3B described below differs from the lens barrel 3 described above only in terms of the configurations of the rotary ring, the second cam ring, and the rectilinear guide/movable frame, and only portions different from the corresponding portions of the lens barrel 3 will therefore be described in detail. The other portions have the same reference characters as those of the corresponding portions of the lens barrel 3, and no description thereof will be made.

The lens barrel 3B includes the fixed ring 11, a rotary ring 12B, the rectilinear cam ring 13, the first cam ring 14, a second cam ring 15B, the rectilinear guide ring 16, a rectilinear guide/movable frame 17B, the movable frame 18, and the first-group frame 19.

The rotary ring 12B has a substantially tubular shape slightly smaller than the fixed ring 11, and cam guide grooves 12e, 12e, 12e are formed in separate positions in the circumferential direction in the rotary ring 12B.

The second cam ring 15B has a substantially tubular shape smaller than the first cam ring 14, and no cam drive grooves 15c, 15c, 15c are formed in the second cam ring 15B.

The rectilinear guide/movable frame 17B has a holding tubular portion 25 having a substantially tubular shape slightly smaller than the second cam ring 15B and a flange portion 26 overhanging outward from a rear end portion of the holding tubular portion 25.

Cam guide protrusions 17d, 17d, 17d protruding outward are provided on front end portions of the rectilinear lead protrusions 17b, 17b, 17b of the rectilinear guide/movable frame 17B, respectively. No cam drive protrusions 17a, 17a, 17a are provided on the rectilinear guide/movable frame 17B.

The cam guide protrusions 17d, 17d, 17d of the rectilinear guide/movable frame 17B slidably engage with the cam guide grooves 12e, 12e, 12e of the rotary ring 12B, respectively.

The rectilinear guide/movable frame 17B is therefore moved in the optical axis direction in response to the rotation of the rotary ring 12B while the cam guide protrusions 17d, 17d, 17d slide along the cam guide grooves 12e, 12e, 12e respectively and the rectilinear lead protrusions 17b, 17b, 17b are guided along the rectilinear lead grooves 13e, 13e, 13e respectively.

<Operation in Third Embodiment>

Figure 9:
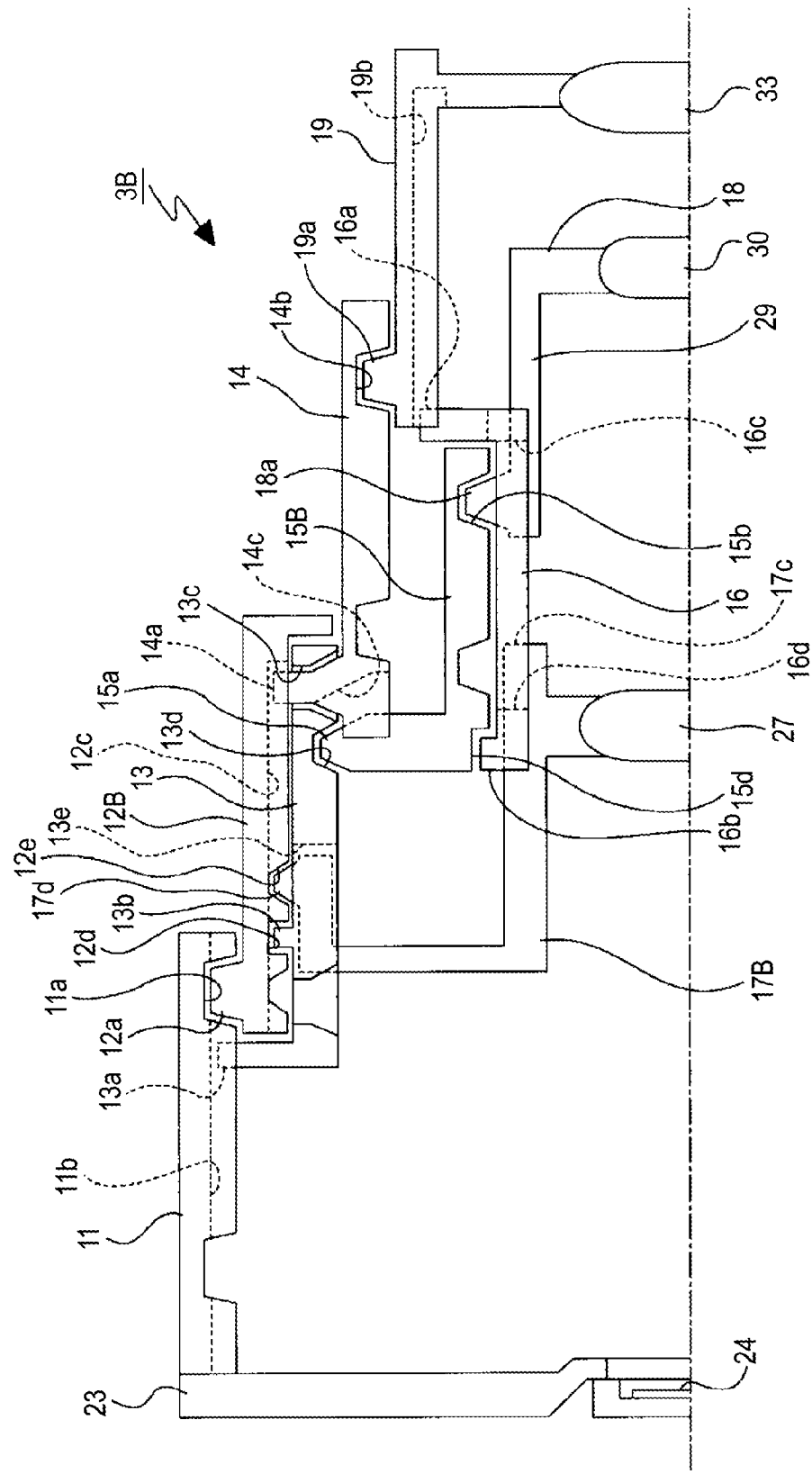
FIG. 9, along with FIG. 10, shows a lens barrel according to a third embodiment and is a cross-sectional view conceptually showing the state of the lens barrel in the extended position.
Figure 10:
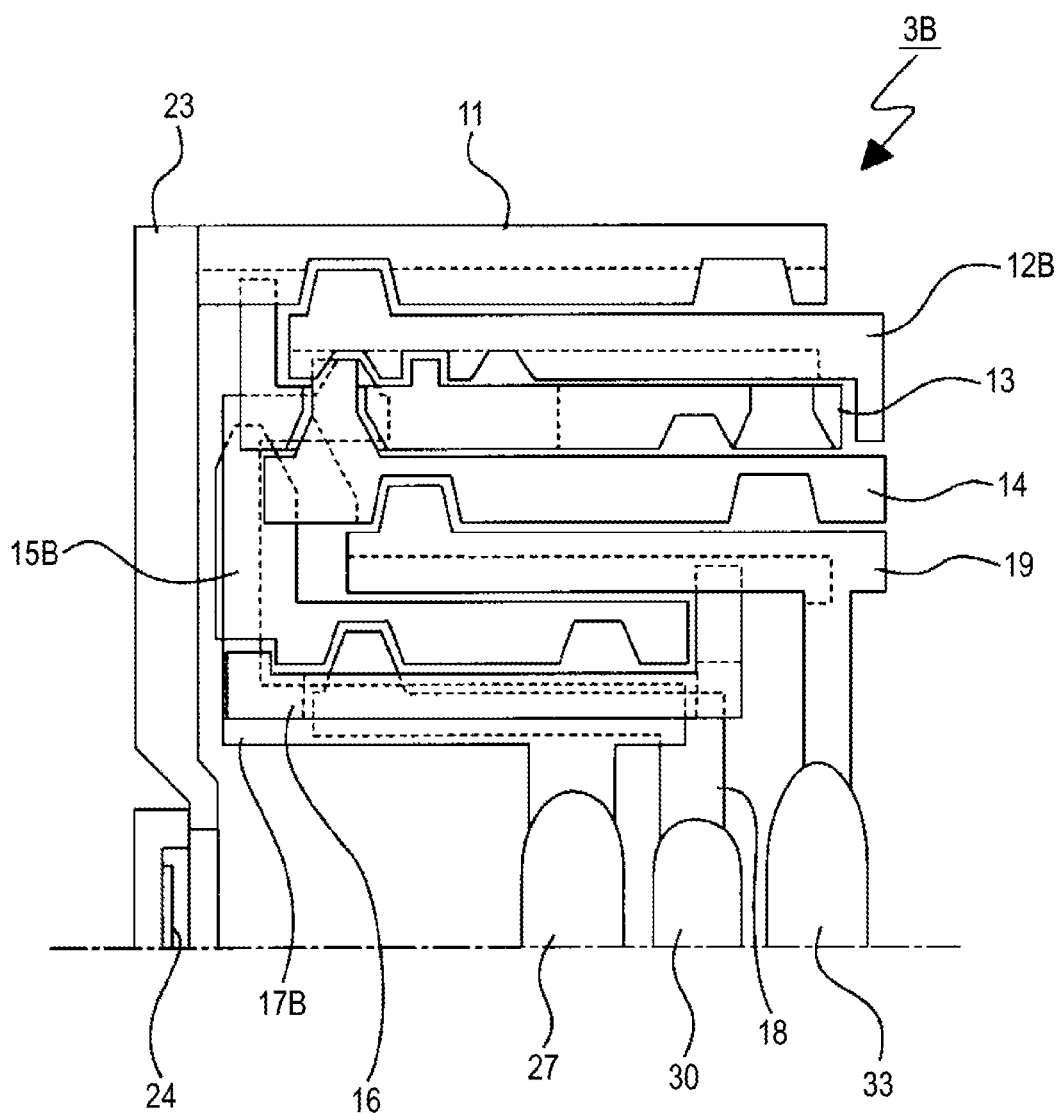
FIG. 10 is a cross-sectional view conceptually showing the state of the lens barrel in the retracted position.

The lens barrel 3B configured as described above operates in such a way that the lens barrel 3B is extendable between the retracted position (see FIG. 10) and the extended position (see FIG. 9).

When the drive force produced by the drive motor 22 rotates the rotary ring 12B, the other portions operate as follows.

The second cam ring 15B is, in response to the rotation of the first cam ring 14 around the axis parallel to the optical axis, rotated and moved in the optical axis direction while the cam engagement protrusions 15a, 15a, 15a slide along the cam engagement grooves 13d, 13d, 13d and the rectilinear guide recesses 14c, 14c, 14c.

The rectilinear guide/movable frame 17B is moved in the optical axis direction in response to the rotation of the rotary ring 12B while the cam guide protrusions 17d, 17d, 17d slide along the cam guide grooves 12e, 12e, 12e respectively and the rectilinear lead protrusions 17b, 17b, 17b are guided along the rectilinear lead grooves 13e, 13e, 13e.

<Brief of Third Embodiment>

As described above, the lens barrel 3B includes the first-group frame 19, which holds the first lens group 33, the rectilinear guide ring 16, which guides the first-group frame 19 in the optical axis direction, the rectilinear guide/movable frame 17B, which guides the rectilinear guide ring 16 in the optical axis direction, and the rectilinear cam ring 13, which guides the rectilinear guide/movable frame 17B in the optical axis direction, and the lens barrel 3B is so configured that the rectilinear component of the rectilinear guide ring 16, which guides the first-group frame 19 in the optical axis direction, is passed from the rectilinear cam ring 13 via the rectilinear guide/movable frame 17B.

It is therefore not necessary to provide the rectilinear guide ring 16 with guided protrusions elongated in the optical axis direction, located beyond the second cam ring 15B, and connecting the rectilinear guide ring 16 to the rectilinear cam ring 13, whereby the size of the lens barrel 3B in the optical axis direction can be reduced accordingly.

Further, since the rectilinear guide/movable frame 17B is a member necessary to form the lens barrel 3B, the number of parts will not increase even when the lens barrel 3B is so configured that the rectilinear component of the rectilinear guide ring 16 is passed from the rectilinear cam ring 13 via the rectilinear guide/movable frame 17B, whereby the size of the lens barrel 3B can be reduced without any increase in the number of parts or manufacturing cost.

Further, in the lens barrel 3B, the cam engagement protrusions 15a, 15a, 15a are provided on the second cam ring 15B, and the cam engagement grooves 13d, 13d, 13d, which slidably engage with the cam engagement protrusions 15a, 15a, 15a, respectively, are provided in the rectilinear cam ring 13.

As a result, the second cam ring 15B is moved in the optical axis direction irrespective of the movement of the first cam ring 14 in the optical axis direction, whereby the degree of freedom in design can be increased.

The lens barrel 3B is further configured as follows: The movable frame 18 having the cam action protrusions 18a, 18a, 18a is provided; the cam action grooves 15b, 15b, 15b, which slidably engage with the cam action protrusions 18a, 18a, 18a, are formed in the second cam ring 15B; the cam guide protrusions 17d, 17d, 17d are provided on the rectilinear guide/movable frame 17B; and the cam guide grooves 12e, 12e, 12e, which slidably engage with the cam guide protrusions 17d, 17d, 17d, are formed in the rotary ring 12B.

As described above, in the lens barrel 3B, the cam action grooves 15b, 15b, 15b, which move the movable frame 18 in the optical axis direction, are formed in the second cam ring 15B, and the cam guide grooves 12e, 12e, 12e, which move the rectilinear guide/movable frame 17B in the optical axis direction, are formed in the rotary ring 12B.

It is therefore not necessary to form both the following two portions in the second cam ring 15B: a portion that moves the movable frame 18 in the optical axis direction; and a portion that moves the rectilinear guide/movable frame 17B in the optical axis direction. The degree of freedom in designing each of the second cam ring 15B and the rotary ring 12B therefore increases.

<Configuration and Other Features of Fourth Embodiment>

The configuration of a lens barrel 3C according to a fourth embodiment will next be described (see FIGS. 11 and 12).

The lens barrel 3C described below differs from the lens barrel 3 described above only in terms of the configurations of the rotary ring, the rectilinear cam ring, the first cam ring, the second cam ring, and the rectilinear guide/movable frame, and only portions different from the corresponding portions of the lens barrel 3 will therefore be described in detail. The other portions have the same reference characters as those of the corresponding portions of the lens barrel 3, and no description thereof will be made.

The lens barrel 3C includes the fixed ring 11, a rotary ring 12C, a rectilinear cam ring 13C, a first cam ring 14C, a second cam ring 15C, the rectilinear guide ring 16, a rectilinear guide/movable frame 17C, the movable frame 18, and the first-group frame 19.

The rotary ring 12C has a substantially tubular shape slightly smaller than the fixed ring 11, and cam guide grooves 12e, 12e, 12e are formed in separate positions in the circumferential direction in the rotary ring 12C.

The rectilinear cam ring 13C has a substantially tubular shape slightly smaller than the rotary ring 12C, and no cam engagement grooves 13d, 13d, 13d are formed in the rectilinear cam ring 13C.

The first cam ring 14C has a substantially tubular shape slightly smaller than the rectilinear cam ring 13C, and fitting recesses 14d, 14d, 14d are formed in separate positions in the circumferential direction in a rear end portion of the first cam ring 14C. No rectilinear guide recesses 14c, 14c, 14c are formed in the first cam ring 14C.

The second cam ring 15C has a substantially tubular shape smaller than the first cam ring 14C, and fitting protrusions 15e, 15e, 15e are provided in separate positions in the circumferential direction on a rear end portion of the second cam ring 15C. No cam engagement protrusions 15a, 15a, 15a are provided on the second cam ring 15C. No cam drive grooves 15c, 15c, 15c are formed in the second cam ring 15C.

The fitting protrusions 15e, 15e, 15e of the second cam ring 15C are fit into fitting recesses 14d, 14d, 14d of the first cam ring 14C, respectively. The second cam ring 15C is thus connected to the first cam ring 14C.

As a result, the second cam ring 15C is rotated integrally with the first cam ring 14C in response to the rotation thereof around the axis parallel to the optical axis and integrally moved with the first cam ring 14C in response to the movement thereof in the optical axis direction.

It is noted that the connection between the second cam ring 15C and the first cam ring 14C is not limited to the fitting between the fitting protrusions 15e, 15e, 15e and the fitting recesses 14d, 14d, 14d but may, for example, be screw fastening or adhesive bonding.

Further, the connection between the second cam ring 15C and the first cam ring 14C may alternatively be made by fitting connection in the optical axis direction and fitting connection in the circumferential direction in different positions.

The rectilinear guide/movable frame 17C has a holding tubular portion 25 having a substantially tubular shape slightly smaller than the second cam ring 15C and a flange portion 26 overhanging outward from a rear end portion of the holding tubular portion 25.

Cam guide protrusions 17d, 17d, 17d protruding outward are provided on front end portions of the rectilinear lead protrusions 17b, 17b, 17b of the rectilinear guide/movable frame 17C, respectively. No cam drive protrusions 17a, 17a, 17a are provided on the rectilinear guide/movable frame 17C.

The cam guide protrusions 17d, 17d, 17d of the rectilinear guide/movable frame 17C slidably engage with the cam guide grooves 12e, 12e, 12e of the rotary ring 12C, respectively.

As a result, the rectilinear guide/movable frame 17C is moved in the optical axis direction in response to the rotation of the rotary ring 12C while the cam guide protrusions 17d, 17d, 17d slide along the cam guide grooves 12e, 12e, 12e respectively and the rectilinear lead protrusions 17b, 17b, 17b are guided along the rectilinear lead grooves 13e, 13e, 13e respectively.

<Operation in Fourth Embodiment>

Figure 11:
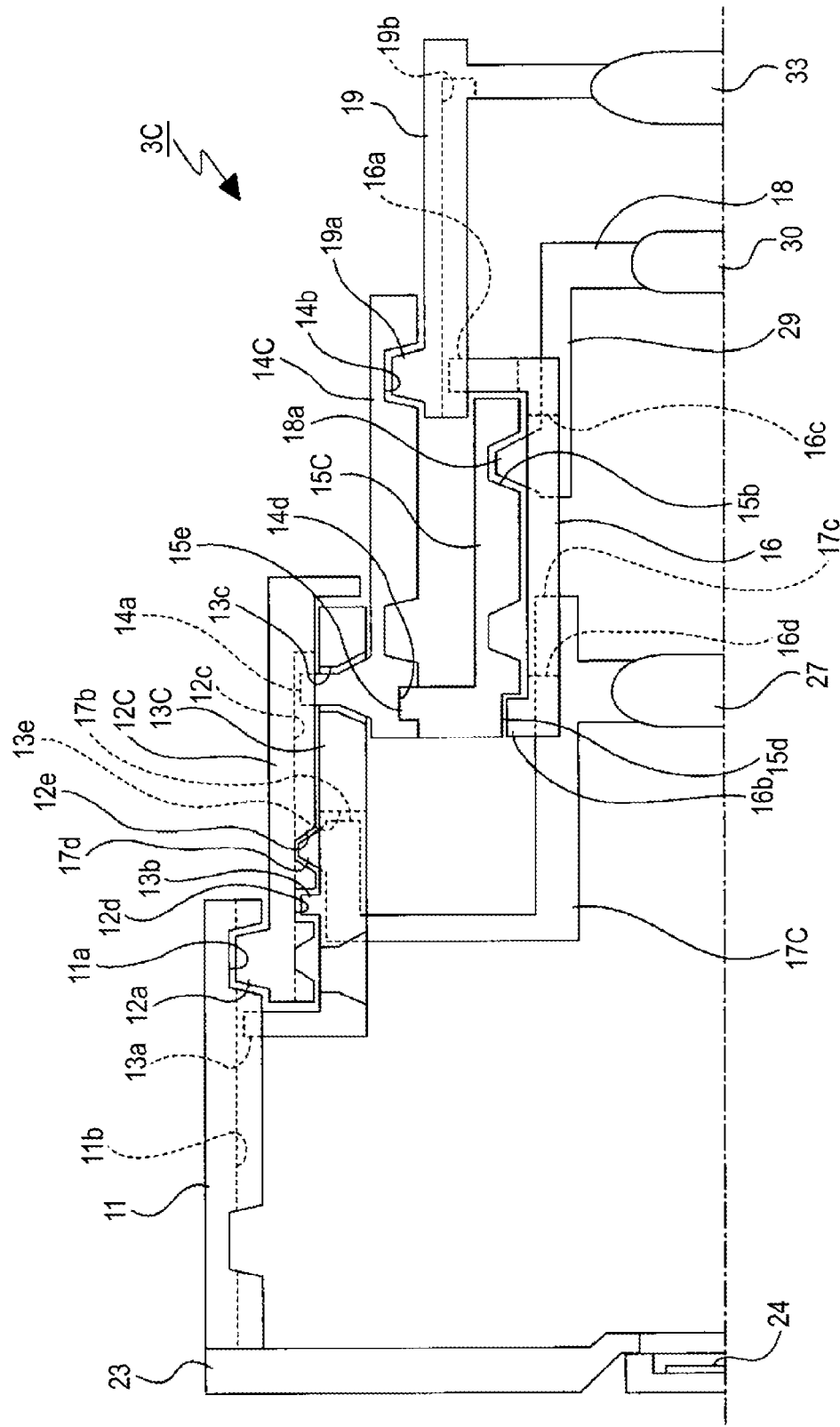
FIG. 11, along with FIG. 12, shows a lens barrel according to a fourth embodiment and is a cross-sectional view conceptually showing the state of the lens barrel in the extended position.
Figure 12:
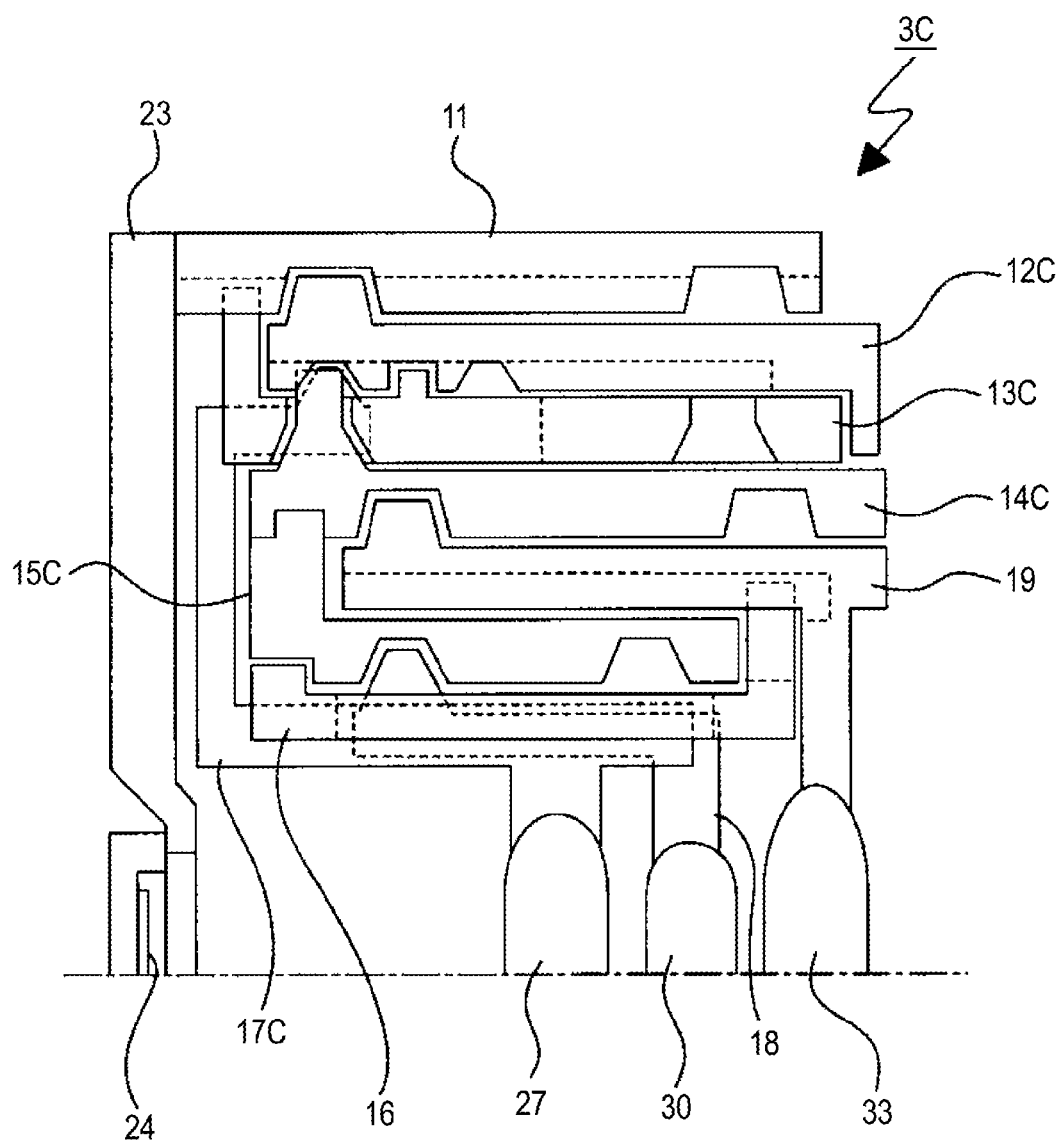
FIG. 12 is a cross-sectional view conceptually showing the state of the lens barrel in the retracted position.

The lens barrel 3C configured as described above operates in such a way that the lens barrel 3C is extendable between the retracted position (see FIG. 12) and the extended position (see FIG. 11).

When the drive force produced by the drive motor 22 rotates the rotary ring 12C, the other portions operate as follows.

The guided protrusions 13a, 13a, 13a are guided along the rectilinear guide grooves 11b, 11b, 11b in response to the rotation of the rotary ring 12C, and the rectilinear cam ring 13C is moved as the rotary ring 12C is moved in the optical axis direction.

The first cam ring 14C is, in response to the rotation of the rotary ring 12C around the axis parallel to the optical axis, rotated and moved in the optical axis direction while the cam slide protrusions 14a, 14a, 14a slide along the cam slide grooves 13c, 13c, 13c and the rectilinear guide grooves 12c, 12c, 12c.

The second cam ring 15C is rotated integrally with the first cam ring 14C in response to the rotation thereof around the axis parallel to the optical axis and moved integrally with the first cam ring 14C in response to the movement thereof in the optical axis direction.

The rectilinear guide/movable frame 17C is moved in the optical axis direction in response to the rotation of the rotary ring 12C while the cam guide protrusions 17d, 17d, 17d slide along the cam guide grooves 12e, 12e, 12e respectively and the rectilinear lead protrusions 17b, 17b, 17b are guided along the rectilinear lead grooves 13e, 13e, 13e respectively.

<Brief of Fourth Embodiment>

As described above, the lens barrel 3C includes the first-group frame 19, which holds the first lens group 33, the rectilinear guide ring 16, which guides the first-group frame 19 in the optical axis direction, the rectilinear guide/movable frame 17C, which guides the rectilinear guide ring 16 in the optical axis direction, and the rectilinear cam ring 13C, which guides the rectilinear guide/movable frame 17C in the optical axis direction, and the lens barrel 3C is so configured that the rectilinear component of the rectilinear guide ring 16, which guides the first-group frame 19 in the optical axis direction, is passed from the rectilinear cam ring 13C via the rectilinear guide/movable frame 17C.

It is therefore not necessary to provide the rectilinear guide ring 16 with guided protrusions elongated in the optical axis direction, located beyond the second cam ring 15C, and connecting the rectilinear guide ring 16 to the rectilinear cam ring 13C, whereby the size of the lens barrel 3C in the optical axis direction can be reduced accordingly.

Further, since the rectilinear guide/movable frame 17C is a member necessary to form the lens barrel 3C, the number of parts will not increase even when the lens barrel 3C is so configured that the rectilinear component of the rectilinear guide ring 16 is passed from the rectilinear cam ring 13C via the rectilinear guide/movable frame 17C, whereby the size of the lens barrel 3C can be reduced without any increase in the number of parts or manufacturing cost.

Further, in the lens barrel 3C, the first cam ring 14C and the second cam ring 15C are so supported that they are unable to move relative to each other in the optical axis direction.

The first cam ring 14C and the second cam ring 15C are therefore moved integrally with each other in the optical axis direction, whereby the operation can be simplified.

The lens barrel 3C is further configured as follows: The movable frame 18 having the cam action protrusions 18a, 18a, 18a is provided; the cam action grooves 15b, 15b, 15b, which slidably engage with the cam action protrusions 18a, 18a, 18a, are formed in the second cam ring 15C; the cam guide protrusions 17d, 17d, 17d are provided on the rectilinear guide/movable frame 17C; and the cam guide grooves 12e, 12e, 12e, which slidably engage with the cam guide protrusions 17d, 17d, 17d, are formed in the rotary ring 12C.

As described above, in the lens barrel 3C, the cam action grooves 15b, 15b, 15b, which move the movable frame 18 in the optical axis direction, are formed in the second cam ring 15C, and the cam guide grooves 12e, 12e, 12e, which move the rectilinear guide/movable frame 17C in the optical axis direction, are formed in the rotary ring 12C.

It is therefore not necessary to form both the following two portions in the second cam ring 15C: a portion that moves the movable frame 18 in the optical axis direction; and a portion that moves the rectilinear guide/movable frame 17C in the optical axis direction. The degree of freedom in designing each of the second cam ring 15C and the rotary ring 12C therefore increases.

[Others]

The above description has been made with reference to the case where the movable frame 18 holds the second lens group 30 and the rectilinear guide/movable frame 17 holds the third lens group 27, but the movable frame 18 and the rectilinear guide/movable frame 17 are not necessarily configured to hold lens groups but may alternatively hold other optical elements for blocking light or otherwise processing light, such as an aperture stop.

Further, the lens group configuration in each of the lens barrels 3, 3A, 3B, and 3C is not limited to a three-group configuration and may alternatively be formed of an arbitrary number of groups. In this case, the lens barrel 3 (3A, 3B, 3C) does not need to have the three-stage configuration in which the rotary ring 12 (12B, 12C), the first cam ring 14 (14A, 14C), and the first-group frame 19 are provided as described above and may have a configuration formed of an arbitrary number of stages, such as a four-stage configuration or a five-stage configuration, in accordance with the lens groups to be held and other factors.

[Embodiment of Imaging Apparatus]

Figure 13:
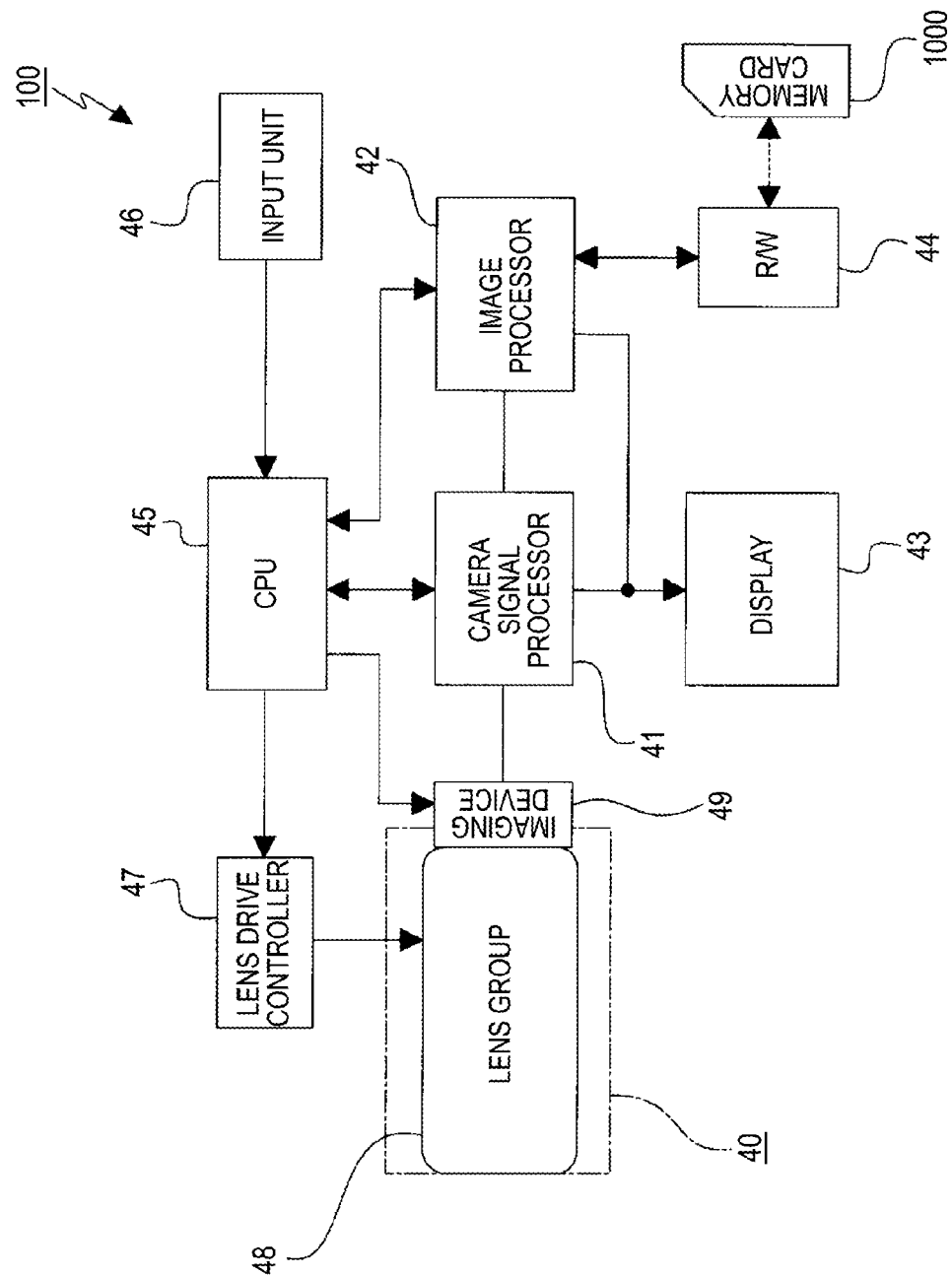
FIG. 13 is a block diagram of an imaging apparatus.

FIG. 13 is a block diagram of still camera (digital still camera) as an imaging apparatus according to an embodiment of the present technology.

An imaging apparatus (digital still camera) 100 (imaging apparatus 1) includes a camera block 40 responsible for image capturing, a camera signal processor 41 that performs signal processing, such as conversion of an analog captured image signal into a digital image signal, and an image processor 42 that records and reproduces the resultant image signal. The imaging apparatus 100 further includes a display 43, such as an LCD (liquid crystal display), for displaying a captured image and other information, a R/W (reader/writer) 44 that writes and reads an image signal to and from a memory card 1000, a CPU (central processing unit) 45 that controls the entire imaging apparatus 100, an input unit 46 formed of a variety of switches and other parts operated by a user as necessary, and a lens drive controller 47 that controls driving of lenses disposed in the camera block 40.

The camera block 40 is formed of an optical system including a lens group 48, an imaging device 49, such as a CCD (charge coupled device) and a CMOS (complementary metal-oxide semiconductor) device, and other parts.

The camera signal processor 41 converts an output signal from the imaging device 49 into a digital signal, performs noise removal and image quality correction, converts the digital signal into brightness/color difference signals, and performs other types of signal processing.

The image processor 42 performs compression encoding and decompression decoding on an image signal based on a predetermined image data format, performs data format conversion, such as resolution conversion, and performs other types of image processing.

The display 43 has a function of displaying a variety of data, such as user's operation through the input unit 46 and captured images.

The R/W 44 writes image data encoded by the image processor 42 to the memory card 1000 and reads image data recorded on the memory card 1000.

The CPU 45 functions as a control processor that controls circuit blocks provided in the imaging apparatus 100 and controls each of the circuit blocks based, for example, on an instruction input signal from the input unit 46.

The input unit 46 is formed, for example, of a shutter release button for shutter operation and a selection switch for selecting an action mode and outputs an instruction input signal according to user's operation to the CPU 45.

The lens drive controller 47 controls a motor or any other actuator (not shown) that drives lenses in the lens group 48 based on a control signal from the CPU 45.

The memory card 1000 is, for example, a semiconductor memory that can be inserted and removed to and from a slot connected to the R/W 44.

The operation of the imaging apparatus 100 will be described below.

In an image capturing standby state, an image signal captured by the camera block 40 is outputted to the display 43 through the camera signal processor 41 and displayed as camera-through images on the display 43 under the control of the CPU 45. When a zooming instruction input signal is inputted from the input unit 46, the CPU 45 outputs a control signal to the lens drive controller 47, and a predetermined lens in the lens group 48 is moved under the control of the lens drive controller 47.

When a shutter (not shown) in the camera block 40 is operated in response to an instruction input signal from the input unit 46, the camera signal processor 41 outputs a captured image signal to the image processor 42, which performs compression encoding on the image signal and converts the encoded image signal into digital data expressed in a predetermined data format. The converted data is outputted to the R/W 44, which writes the data to the memory card 1000.

When the shutter release button in the input unit 46 is, for example, pressed halfway or fully pressed for recording (imaging), focusing is carried out as follows: The lens drive controller 47 moves a predetermined lens in the lens group 48 based on a control signal from the CPU 45.

To reproduce image data recorded on the memory card 1000, predetermined image data is read from the memory card 1000 through the R/W 44 in response to user's operation through the input unit 46. The image processor 42 performs decompression decoding on the read image data, and an image signal to be reproduced is then outputted to the display 43 and displayed as reproduced images.

The present technology can also be configured as follows.

(1) A lens barrel including a first-group frame provided with a cam follower; a first cam ring which is provided with a cam slide protrusion and in which a cam groove that slidably engages with the cam follower is formed; a second cam ring so supported by the first cam ring that the first cam ring and the second cam ring are unable to rotate relative to each other around an axis parallel to an optical axis; a rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction; a rectilinear guide/movable frame that guides the rectilinear guide ring in the optical axis direction; a rectilinear cam ring in which a cam slide groove that slidably engages with the cam slide protrusion is formed and which guides the rectilinear guide/movable frame in the optical axis direction; and a rotary ring so supported by the rectilinear cam ring that the rectilinear cam ring and the rotary ring are rotatable relative to each other around the axis parallel to the optical axis and unmovable relative to each other in the optical axis direction.

(2) The lens barrel described in (1), wherein the second cam ring is so supported by the first cam ring that the first cam ring and the second cam ring are unable to move relative to each other in the optical axis direction.

(3) The lens barrel described in (1), wherein a cam engagement protrusion is provided on the second cam ring, and a cam engagement groove that slidably engages with the cam engagement protrusion is formed in the rectilinear cam ring.

(4) The lens barrel described in any of (1) to (3), wherein a cam drive protrusion is provided on the rectilinear guide/movable frame, and a cam drive groove that slidably engages with the cam drive protrusion is formed in the second cam ring.

(5) The lens barrel described in (2) or (3), further including a movable frame having a cam action protrusion, wherein a cam action groove that slidably engages with the cam action protrusion is formed in the second cam ring, a cam guide protrusion is provided on the rectilinear guide/movable frame, and a cam guide groove that slidably engages with the cam guide protrusion is formed in the rotary ring.

(6) An imaging apparatus including a lens barrel that accommodates an optical system and an imaging device that converts an optical image introduced via the optical system into an electric signal, wherein the lens barrel includes a first-group frame provided with a cam follower, a first cam ring which is provided with a cam slide protrusion and in which a cam groove that slidably engages with the cam follower is formed, a second cam ring so supported by the first cam ring that the first cam ring and the second cam ring are unable to rotate relative to each other around an axis parallel to an optical axis, a rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction, a rectilinear guide/movable frame that guides the rectilinear guide ring in the optical axis direction, a rectilinear cam ring in which a cam slide groove that slidably engages with the cam slide protrusion is formed and which guides the rectilinear guide/movable frame in the optical axis direction, and a rotary ring so supported by the rectilinear cam ring that the rectilinear cam ring and the rotary ring are rotatable relative to each other around the axis parallel to the optical axis and unmovable relative to each other in the optical axis direction.

The specific shapes and structures of the parts shown in the best mode described above are all presented only by way of example for implementing the present technology and should not be used to construe the technical extent of the present technology in a limited sense.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel comprising:
   a first-group frame provided with a cam follower;
   a first cam ring which is provided with a cam slide protrusion and in which a cam groove that slidably engages with the cam follower is formed;
   a second cam ring so supported by the first cam ring that the first cam ring and the second cam ring are unable to rotate relative to each other around an axis parallel to an optical axis;
   a rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction;
   a rectilinear guide/movable frame that guides the rectilinear guide ring in the optical axis direction;
   a rectilinear cam ring in which a cam slide groove that slidably engages with the cam slide protrusion is formed and which guides the rectilinear guide/movable frame in the optical axis direction; and
   a rotary ring so supported by the rectilinear cam ring that the rectilinear cam ring and the rotary ring are rotatable relative to each other around the axis parallel to the optical axis and unmovable relative to each other in the optical axis direction.

2. The lens barrel according to claim 1,
   wherein the second cam ring is so supported by the first cam ring that the first cam ring and the second cam ring are unable to move relative to each other in the optical axis direction.

3. The lens barrel according to claim 1,
   wherein a cam engagement protrusion is provided on the second cam ring, and
   a cam engagement groove that slidably engages with the cam engagement protrusion is formed in the rectilinear cam ring.

4. The lens barrel according to claim 1,
   wherein a cam drive protrusion is provided on the rectilinear guide/movable frame, and
   a cam drive groove that slidably engages with the cam drive protrusion is formed in the second cam ring.

5. The lens barrel according to claim 1,
   further comprising a movable frame having a cam action protrusion,
   wherein a cam action groove that slidably engages with the cam action protrusion is formed in the second cam ring,
   a cam guide protrusion is provided on the rectilinear guide/movable frame, and
   a cam guide groove that slidably engages with the cam guide protrusion is formed in the rotary ring.

6. An imaging apparatus comprising:
   a lens barrel that accommodates an optical system; and
   an imaging device that converts an optical image introduced via the optical system into an electric signal,
   wherein the lens barrel includes
      a first-group frame provided with a cam follower,
      a first cam ring which is provided with a cam slide protrusion and in which a cam groove that slidably engages with the cam follower is formed,
      a second cam ring so supported by the first cam ring that the first cam ring and the second cam ring are unable to rotate relative to each other around an axis parallel to an optical axis,
      a rectilinear guide ring so supported by the second cam ring that the second cam ring and the rectilinear guide ring are rotatable relative to each other around the axis parallel to the optical axis and unmovable relative to each other in the optical axis direction, the rectilinear guide ring guiding the first-group frame in the optical axis direction,
      a rectilinear guide/movable frame that guides the rectilinear guide ring in the optical axis direction,
      a rectilinear cam ring in which a cam slide groove that slidably engages with the cam slide protrusion is formed and which guides the rectilinear guide/movable frame in the optical axis direction, and
      a rotary ring so supported by the rectilinear cam ring that the rectilinear cam ring and the rotary ring are rotatable relative to each other around the axis parallel to the optical axis and unmovable relative to each other in the optical axis direction.

* * * * *